US 6,641,732 B1

(12) United States Patent
Cheyne

(10) Patent No.: US 6,641,732 B1
(45) Date of Patent: Nov. 4, 2003

(54) CROSS-FLOW TANK SYSTEM FOR AQUATIC LIFE

(75) Inventor: Matthew Cheyne, Perth (AU)

(73) Assignee: Live Link Australia Pty Ltd, Perth (AU)

(*) Notice: Subject to any disclaimer, the term of this patent is extended or adjusted under 35 U.S.C. 154(b) by 19 days.

(21) Appl. No.: 09/890,158

(22) PCT Filed: Jun. 30, 2000

(86) PCT No.: PCT/AU00/00800

§ 371 (c)(1),
(2), (4) Date: Feb. 5, 2002

(87) PCT Pub. No.: WO01/01765

PCT Pub. Date: Jan. 11, 2001

(30) Foreign Application Priority Data

Jun. 30, 1999 (AU) .............................. PQ 1295
Oct. 29, 1999 (AU) .............................. PQ 3753

(51) Int. Cl.[7] .......................... A01K 63/04; C02F 3/06; C02F 1/78
(52) U.S. Cl. .................. 210/615; 210/620; 210/631; 210/169; 210/181; 210/198.1; 210/416.2; 210/905
(58) Field of Search ................... 210/615–618, 210/620, 631, 903, 905, 169, 407, 408–412, 416.2, 181, 198.1; 119/226, 227, 259–261, 262

(56) References Cited

U.S. PATENT DOCUMENTS

| | | | | |
|---|---|---|---|---|
| 2,595,965 A | * | 5/1952 | Ludwick ...................... | 119/264 |
| 2,672,845 A | * | 3/1954 | Schneithorst ................ | 119/262 |
| 3,688,907 A | * | 9/1972 | Oravec ......................... | 210/169 |
| 3,722,685 A | * | 3/1973 | Orensten et al. ............ | 210/169 |
| 4,141,318 A | | 2/1979 | MacVane et al. | |
| 4,606,821 A | | 8/1986 | D'Imperio | |
| 4,684,462 A | * | 8/1987 | Augustyniak ................ | 210/97 |

(List continued on next page.)

FOREIGN PATENT DOCUMENTS

| AU | 688921 | 3/1996 |
|---|---|---|
| DE | 539 208 A | 11/1931 |

(List continued on next page.)

*Primary Examiner*—Fred G. Prince
(74) *Attorney, Agent, or Firm*—Miles & Stockbridge P.C.; John C. Kerins

(57) ABSTRACT

A tank system and a method for accommodating aquatic life and particularly fish. The tank system comprises a holding tank for holding fluid to sustain aquatic life disposed therein and a filtering means in the form of a biofilter for receiving extraneous fluid from the top of the holding tank at one side thereof separated from the biofilter by a partition. A tank discharge means comprising a longitudinally extending lip surmounts the partition to permit the discharge and passage of extraneous fluid from the top of the holding tank via a prefilter to a filtering area in which the biofilter is disposed. Recirculating means including a network of pipes is provided for recirculating the extraneous fluid passed through biofilter by gravity, from the bottom of the filtering area back to the holding tank via one or pumps and a pair of water inlet lines. The water inlet lines are disposed at the base of the holding tank, opposite, and extending generally parallel, to the tank discharge means and inject fluid under pressure into the tank in a direction so as to provide for a uniform, circulatory cross-flow of fluid about a generally horizontal axis in substantially parallel relationship to the lip. A particular form of prefilter for extracting suspended solids and protein to a foam fractionator is also disclosed as well as a buffer tank arrangement for accommodating overfilling of the holding tank, and the process involved with generating the cross-flow.

66 Claims, 28 Drawing Sheets

U.S. PATENT DOCUMENTS

| | | |
|---|---|---|
| 4,844,013 A | 7/1989 | De Haan et al. |
| 4,861,465 A | 8/1989 | Augustyniak |
| 4,915,828 A | 4/1990 | Meyers et al. |
| 5,006,230 A | 4/1991 | Votava, III et al. |
| 5,054,424 A * | 10/1991 | Sy .............................. 119/260 |
| 5,084,164 A * | 1/1992 | Del Rosario ................. 210/94 |
| 5,249,548 A | 10/1993 | Dupuy |
| 5,306,421 A | 4/1994 | Weinstein |
| 5,469,810 A * | 11/1995 | Chiang ....................... 119/248 |
| 5,736,034 A | 4/1998 | Phillips et al. |
| 5,830,355 A | 11/1998 | Harris |
| 5,979,362 A | 11/1999 | McRobert |

FOREIGN PATENT DOCUMENTS

| | | |
|---|---|---|
| DE | 32 10972 A1 | 3/1982 |
| DE | 40 33 223 A1 | 10/1990 |
| FR | 2 706244 | 12/1994 |
| GB | 1 495 764 | 12/1977 |
| WO | WO 94/15691 | 7/1994 |
| WO | WO 98/51618 | 11/1998 |

* cited by examiner

US 6,641,732 B1

CROSS-FLOW TANK SYSTEM FOR AQUATIC LIFE

FIELD OF THE INVENTION

This invention relates to a tank system for accommodating aquatic life and a method therefor. The invention has particular, although not exclusive, utility in accommodating live fish including shellfish, and especially rock lobster and abalone for holding and display purposes.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

Present tank systems for accommodating rock lobster in particular, in a closed circuit system, essentially consist of a long tank filled with water in which a number of rock lobster are disposed, such as is shown in FIG. 1 of the drawings. At one end of the tank A is provided a prefilter B and a biofilter C of known design. At the other end of the tank A is a protein skimmer D and associated pipe circuitry. A rectangular arrangement of water suction lines E are disposed at the base of the tank A and are connected to a pump F via an inlet line G. The pump F in turn is connected to an outlet manifold H via a water outlet line I. The manifold H is provided with a series of nozzles for spraying water which is sucked from the bottom of the tank via the suction lines E into the prefilter B to pass through the biofilter C. The biofilter C is provided with a pair of discharge pipes J for discharging water filtered by the biofilter back into the holding tank A.

As shown in FIG. 1, the prefilter B is disposed above the biofilter C, which in turn is disposed above the tank A at the one end thereof.

This prior art tank system has several disadvantages associated with it:

1. The prefilter B is usually neglected because of its elevated position where it is difficult to access.
2. The clean water from the biofilter is discharged into the tank A at one end and due to the arrangement of the suction lines at the base directly below it, creates a vertical water flow which is concentrated at the one end of the tank, short circuiting the flow of water throughout the tank.
3. There is not a uniform flow of clean water discharged into the tank via the discharge pipes J through to the other end of the tank and consequently dead spots are created within the tank.
4. Due to the biofilter size, shape and elevation relative to the tank, a large pump is necessary in order to draw a sufficient volume of water from the bottom of the tank, and deliver it to the prefilter B and biofilter C, so as to keep the biofilter charged with water continuously and the bacteria therein alive, particularly in the off season.
5. In order to clean the biofilter, the pump needs to be switched off and the biofilter drained, thereby killing the active bacteria within the biofilter.
6. There is no area for excess or overflow water from the tank to flow to, if the tank is heavily loaded with product, which is a natural tendency of users of the tank.
7. The tank system is not particularly portable, requiring it to be completely disassembled when transported.

DISCLOSURE OF THE INVENTION

It is an object of the present invention to provide for a more efficient and effective tank system for accommodating aquatic life than the type of prior art tank system described above.

It is a preferred object of the invention to provide for a uniform cross-flow of fluid in a tank system for the purposes of accommodating aquatic life therein.

In accordance with one aspect of the present invention, there is provided a tank system for accommodating aquatic life comprising:

a holding tank for holding fluid to sustain aquatic life disposed therein;

a filtering means for receiving extraneous fluid from the holding tank at one end of a filtering area and allowing the fluid to gravitate through a filtering medium disposed within the filtering area to another end of the filtering area;

tank discharge means to provide for the discharge and passage of the extraneous fluid from the top of the holding tank, along the substantial longitudinal extent of one side thereof, to the top of the filtering area at said one end thereof;

recirculating means for recirculating the extraneous fluid passed through the filtering means, from the other end of said filtering area to the holding tank, the recirculating means including tank inlet means for inletting fluid under pressure from the filtering means into the holding tank; and said filtering means being disposed adjacent to the holding tank and the tank discharge means allowing for the natural flow of fluid from the top of the holding tank adjacent to said one side, to the top of the filtering area;

wherein the tank inlet means is disposed at the base of the holding tank, spaced from, and extending generally parallel, to the discharge means to provide for a uniform, circulatory cross-flow of fluid about a generally horizontal axis in substantially parallel relationship to said one side and to said tank inlet means, along the longitudinal extent of the holding tank and the tank discharge means.

Preferably, the tank inlet means has a rectilinear arrangement of inletting nozzles for jetting fluid into said holding tank extending longitudinally thereof, whereby said rectilinear arrangement of inletting nozzles is disposed to be marginally offset from true parallel relationship with said horizontal axis to generate a latent axial flow of fluid relative to said horizontal axis within said holding tank, directing said cross-flow spirally about the central longitudinal axis of the holding tank.

Preferably, the holding tank is provided with opposing end walls, one at each end of said tank inlet means, said walls providing a surface to reflect the latent axial flow of fluid along said holding tank, thereby generating transversely and vertically directed eddy currents at axially spaced apart locations along the surface of said holding tank to focus cross-flow of fluid carrying suspended solids to the top of said holding tank and towards said one side, between successive eddy currents.

Preferably, a plurality of holding tank modules are disposed in sequential and longitudinally contiguous relationship with each other to define a continuous passage between the holding tank modules, whereby fluid in one holding tank module can flow without restriction to an adjacent holding tank module, and vice versa, and wherein said tank inlet means within adjacent holding tank modules is alternately arranged so that said latent axial flow of fluid in one said holding tank module is opposingly directed relative to said latent axial flow of fluid in an adjacent said holding tank module, thereby generating transversely and vertically directed eddy currents at axially spaced apart locations along the surface of each said holding tank module to focus cross-flow of fluid carrying suspended solids to the top of respective said holding tanks and towards said one side thereof between successive eddy currents.

Preferably, the system includes a buffer tank communicating with the filtering means and being connected to said recirculating means separately of said filtering means to supply fluid for inletting into said holding tank separately of said filtering means, thereby providing a separate and parallel flow of fluid to the flow of fluid through said filtering means, said buffer tank having sufficient headroom to receive and accommodate a sudden oversupply of fluid from said holding tank into said filtering means whilst still maintaining a fluid level within said filtering area, said buffer tank being of a height less than the height of the filtering area to prevent a backflow of fluid beyond a prescribed threshold level.

Preferably, the tank discharge means includes a partition to maintain separation of the contents of the holding tank and the filtering means, and a primary lip at the top of the partition, whereby extraneous fluid from the holding tank is permitted to cascade over the primary lip and subsequently pass down through the filtering means.

Preferably, the filtering means includes a prefilter disposed adjacent to the primary lip for extracting solids from the fluid on it cascading over the primary lip prior to passing through to the filtering means, the prefilter including:

(i) a chamber for receiving and expelling liquid from the cascading flow of liquid having an anterior wall surmounted by said primary lip, a posterior wall spaced therefrom surmounted by a secondary lip and a bottom; and (ii) a suction pipe disposed longitudinally within said chamber in parallel spaced relationship to said walls having a series of inlet holes to extract some of the liquid with entrained solids therein from said chamber.

Preferably, the prefilter includes a flow diverting means to divert and reverse the flow of fluid from the cascading flow over the primary lip so that a reversing and opposing fluid flow. is created adjacent the cascading flow from the primary lip so that a reversing and opposing fluid flow is created adjacent the cascading flow from said primary lip and upwardly along the posterior wall of said chamber. In this manner, the reversing liquid flow acts to retain solids in the cascading flow for subsequent extraction.

Preferably, the series of holes are disposed on the surface of said suction pipe at a position to confront the cascading flow to facilitate extracting solids retained therein.

Preferably, the the relative height of the secondary lip is less than the height of the primary lip so as to facilitate subsequent cascading of the reversing fluid flow over the secondary lip and into the one end of the filtering means.

In accordance with a second aspect of the present invention, there is provided a tank system for accommodating aquatic life comprising:

a holding tank for holding fluid to sustain aquatic life disposed therein;

a filtering means for receiving extraneous fluid from said holding tank at one end of a filtering area and allowing the fluid to pass through a filtering medium disposed within the filtering area to another end of the filtering area;

tank discharge means to provide for the discharge and passage of the extraneous fluid from said holding tank to the top of said filtering means;

recirculating means for recirculating the extraneous fluid passed through said filtering means, from proximate the bottom of said filtering means to said holding tank;

said filtering means being adjacent to said holding tank and said tank discharge means allowing for the natural flow of fluid from the top of said holding tank adjacent to said one side, to the top of said filtering area; and a buffer tank being adapted to communicate with said filtering means to provide for a common supply of fluid therebetween;

wherein said buffer tank is connected to said recirculating means separately of said filtering means to supply fluid for inletting into said holding tank separately of said filtering means, thereby providing a separate and parallel flow of fluid to the flow of fluid through said filtering means, said buffer tank having sufficient headroom to receive and accommodate a sudden oversupply of fluid from said holding tank into said filtering means whilst still maintaining a fluid level within said filtering area, said buffer tank being of a height less than the height of the filtering area to prevent a backflow of fluid beyond a prescribed threshold level.

In accordance with a third aspect of the present invention, there is provided a method for accommodating aquatic life, comprising:

discharging fluid from the top and along the substantial longitudinal extent of one side of a holding tank filled with fluid in which aquatic life may be disposed;

filtering out impurities from the discharged fluid whilst gravitating through a filtering area;

recirculating filtered fluid to the bottom of the holding tank; and inletting the recirculated filtered fluid into the tank under pressure at a position spaced from and generally parallel to where the fluid is discharged from the holding tank, so that a uniform, circulatory cross-flow of fluid is created along the longitudinal extent of the holding tank about a generally horizontal axis in substantially parallel relationship to said one side.

Preferably, the method includes inletting recirculated fluid into the holding tank from directly below where fluid is discharged, at an oblique angle relative to the horizontal and vertical, upwardly and transversely across said holding tank in a direction to promote said circulatory cross-flow of fluid.

Preferably, the method includes inletting recirculated fluid into the holding tank from a diagonally opposed position to where fluid is discharged, at an oblique angle relative to the horizontal and vertical, upwardly and transversely across said holding tank, in a direction to promote said circulatory cross-flow of fluid.

Preferably, the method includes directing fluid with more of a horizontal component from the position below from where fluid is discharged than in the case of directing fluid from the diagonally opposed position to where the fluid is discharged.

In accordance with a fourth aspect of the present invention, there is provided a method for accommodating aquatic life, comprising:

discharging fluid from the top of a holding tank filled with fluid in which aquatic life may be disposed;

filtering out impurities from the discharged fluid whilst gravitating through a filtering area;

recirculating filtered fluid to the bottom of the holding tank;

recirculating a separate and parallel flow of filtered fluid after filtering from the filtering area to the holding tank via a buffer tank;

automatically channelling excessive fluid out during the filtering and recirculating steps into said buffer tank when a sudden oversupply of fluid is discharged from said holding tank for filtering, thereby maintaining a fluid level within the filtering area at a prescribed threshold level; and automatically feeding the excessive fluid back during the filtering and recirculating steps, as the excessive discharge volumes are diminished.

BRIEF DESCRIPTION OF THE DRAWINGS

FIG. 14 is a set of orthographically projected views of a biofilter element for use in the biofilter of a smaller tank system as described in the second embodiment, wherein:

FIG. 14a is a side elevation of the rear of the element;

FIG. 14b is a cross sectional end elevation of the element;

FIG. 14c is a plan view of the element;

FIG. 14d is a side elevation of the front of the element;

BEST MODE(S) FOR CARRYING OUT THE INVENTION

Figure 1:
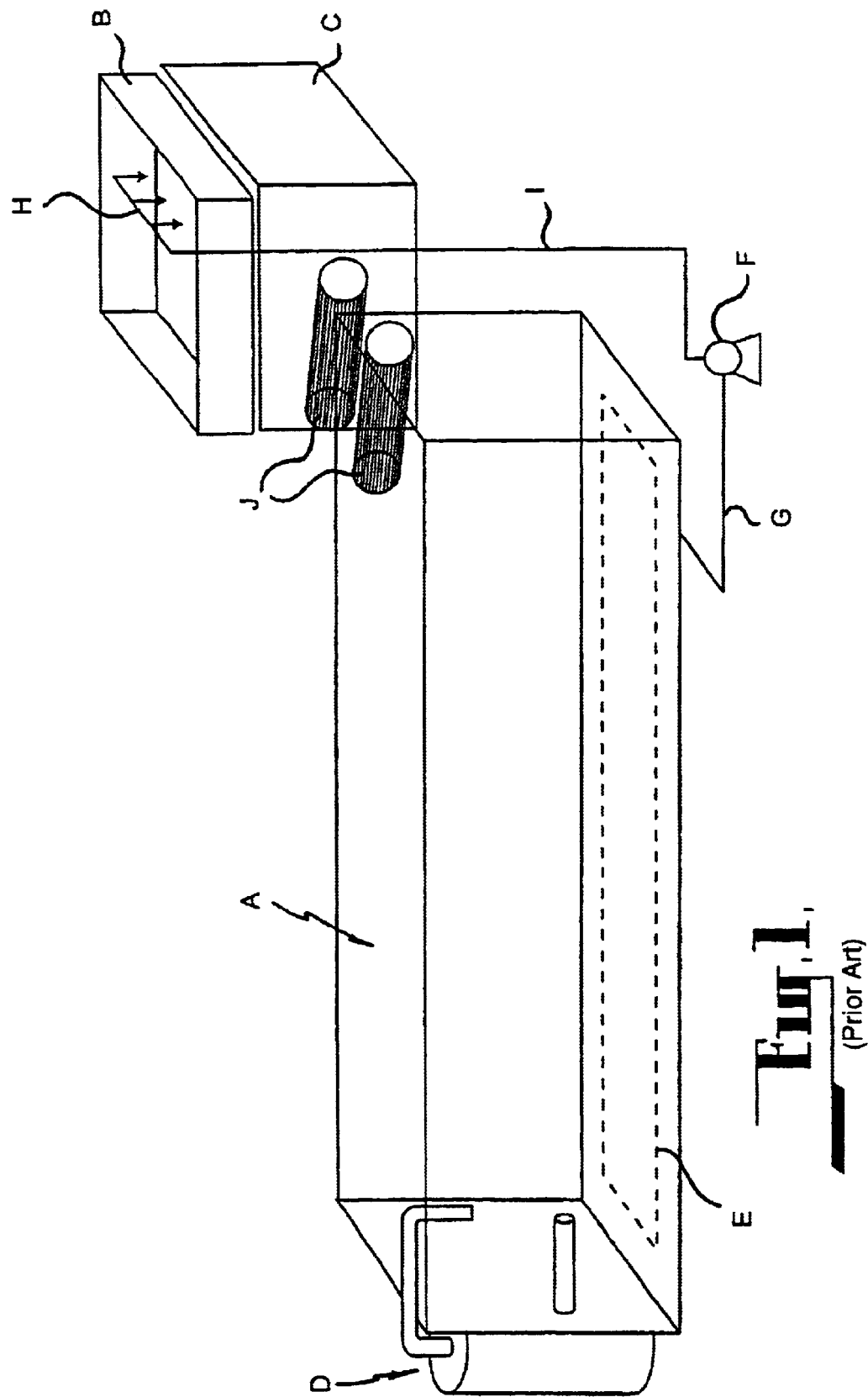
FIG. 1 is an isometric schematic diagram of a typical prior art tank system.
Figure 2:
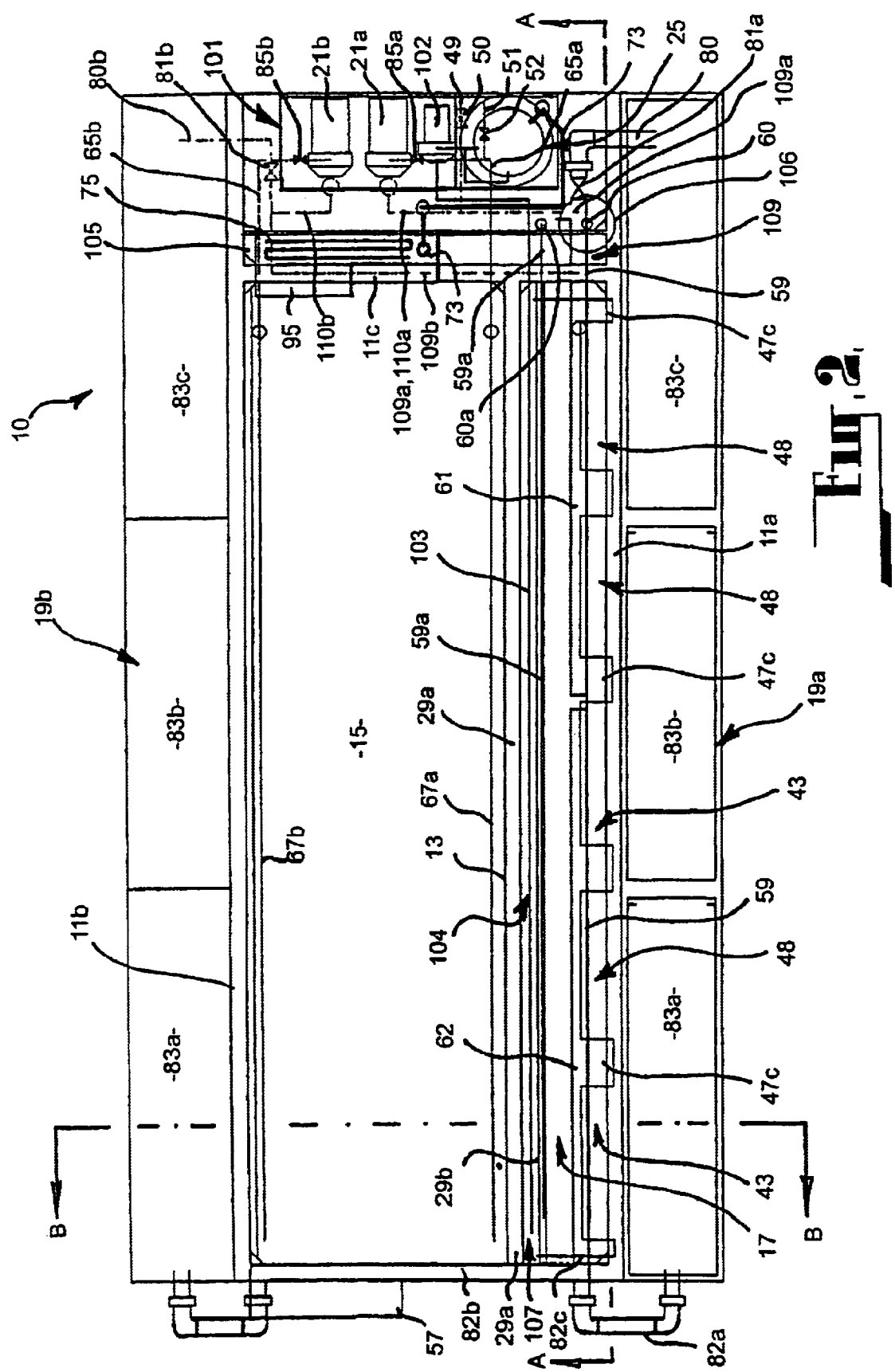
FIG. 2 is a plan view of a tank system in accordance with the first embodiment.
Figure 3:
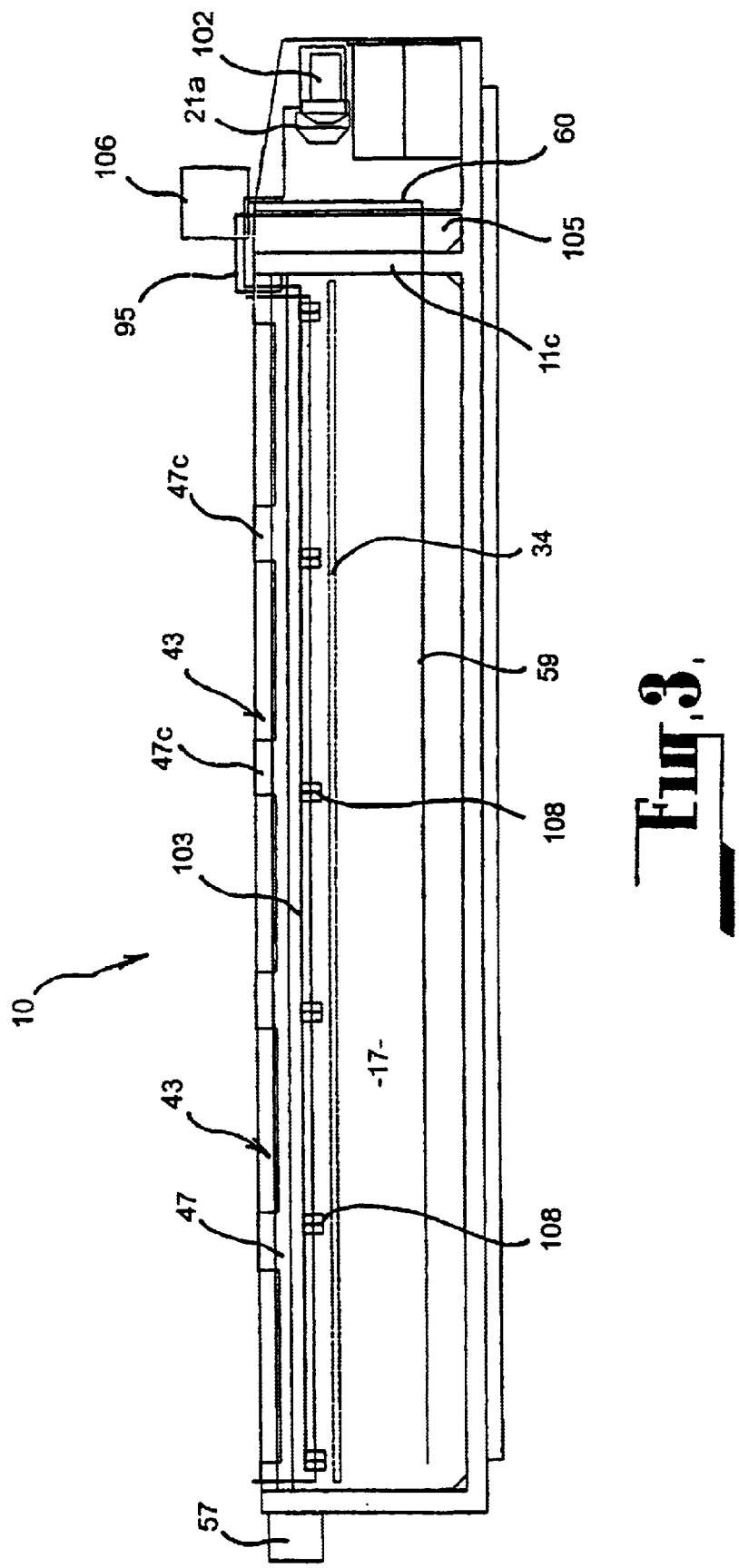
FIG. 3 is a side elevation of the tank system taken along section A—A of FIG. 2.

The first embodiment is directed towards a tank system for fish as shown in FIGS. 2 through to 7 that is sufficiently large to efficiently handle volumes of fish on a relatively large scale for commercial purposes.

The tank system 10 comprises a large main tank 11 that is divided into a holding tank 15 and a filtering area 17 by an inner partition 13. A pair of longitudinally extending buffer tanks 19a and 19b is provided so that one buffer tank is disposed on either longitudinal side of the main tank 11.

The tank system 10 includes a main services area 101 at one end thereof, which accommodates the main operating components of the tank. These include:

a pair of main pumps 21a and 21b connected by a network of pipes on the inlet side to the respective buffer tanks 19a and 19b and the filtering area 17, and by corresponding pipes on the outlet side to the main tank 11 for recirculating fluid throughout the main tank 11 via the buffer tanks and filtering means;

a supplementary filtering means in the form of a foam fractionator, which functions as a solids extracting means or protein skimmer 25, the inlet side of which is connected via an auxiliary pump 102 to the suction pipe 103 of a prefilter 104;

a discharge chamber 105, which is supplied with fluid outlet from the protein skimmer 25 via an outlet pipe 73, for discharging ozone and other gases entrained into the water by the protein skimmer during the fractionation process;

a fluid cooler means in the form of refrigeration system including a cooler or evaporative coil 75 disposed in the discharge chamber 105, a condenser (not shown) and a compressor (not shown); and an air compressor 106 which is connected to an outlet pipe 59 disposed along the bottom of the filtering area 17.

The main pumps 21, protein skimmer 25 and fluid cooler means are all disposed at one end of the system 10, adjacent to the end wall 11a of the main tank, in a separate services compartment.

The inner partition 13 maintains separation of the contents of the holding tank 15 and the filtering area 17 and has a tank discharge means surmounted thereon. The tank discharge means comprises a primary lip 29a and a secondary lip 29b, the lips respectively forming the opposing upper edges of a chamber 107 which forms part of the prefilter 104.

The tank discharge means effectively provides a knife edge by virtue of the primary lip 29a over which water may cascade and a sequential flow path to guide fluid to the middle of the filtering area 17, over the secondary lip 29b and a 'v' shaped upper drip tray 47.

Filtering means in the form of a biofilter 31 is disposed in the area 17. The biofilter 31 is of known design, consisting of a biomass comprising a multitude of bioballs within which active bacteria may grow.

The bacteria feeds on and thus cleans water and fluid flowing through the biofilter of ammonia and nitrite, which is excreted by the fish or other aquatic animals contained within the holding tank. Thus, the biofilter 31 performs an important filtering and cleansing function for the water 23 contained within the holding tank portion 15 when live fish are disposed therein.

In the present embodiment the continuous flow of water from the holding tank 15 to the filtering area 17 is provided by filling the holding tank with sufficient water 23 to allow it to continuously cascade over the primary lip 29. Thus, the discharge means relies upon discharging water 23 from the holding tank 15 in a continuous flow from the top of the holding tank 15, immediately adjacent to the primary lip 29 of the tank discharge means.

Figure 5:
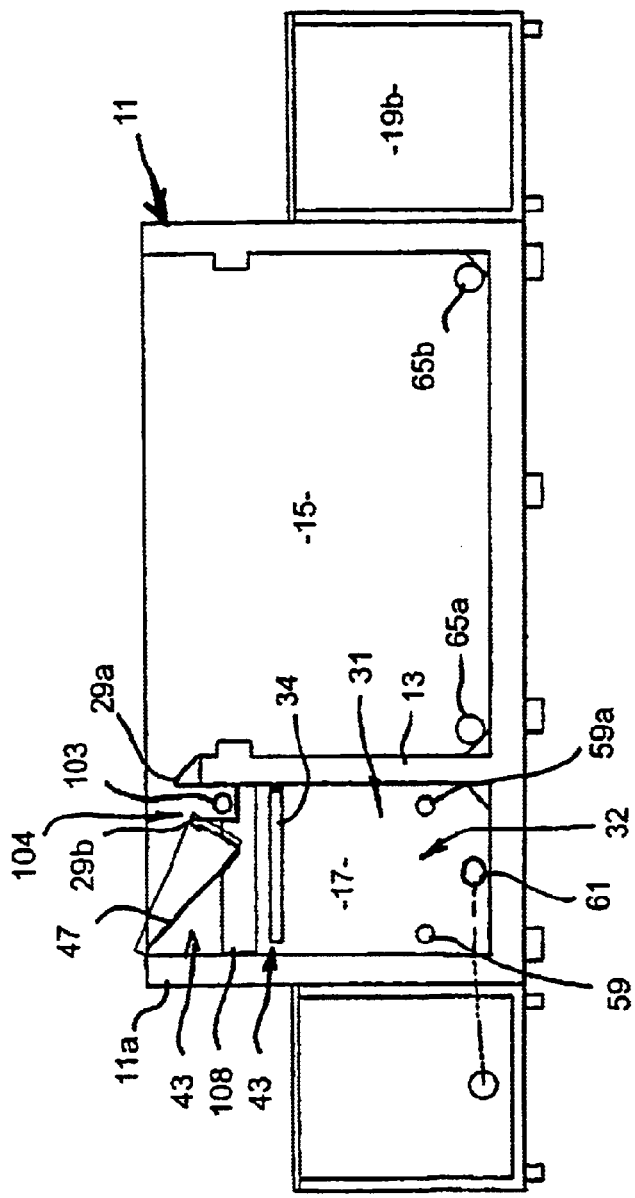
FIG. 5 is a cross-sectional end view of the tank system taken along section B—B of FIG. 2.

As shown in FIG. 5 of the drawings, the suction pipe 103 is circular in diameter and is positioned generally centrally within the chamber 107 so that the external surface of the pipe extends longitudinally along the chamber in parallel spaced relationship to the walls of the chamber. In this manner, a convoluted passageway is defined for water flowing over the top of the primary lip 29a. The passageway is defined between the anterior wall of the chamber that is contiguous with the primary lip 29a and the anterior of the suction pipe 103, then around the bottom of the pipe 103 through the space between the bottom of the pipe and the bottom of the chamber, and then up through the space defined between the posterior of the pipe 103 and the posterior wall that is contiguous with the secondary lip 29b.

The positioning of the suction pipe 103 relative to the walls and bottom of the chamber 107 forms a flow diverting means that diverts and reverses the flow of water from the cascading flow over the primary lip 29a, so that a reversing and opposing liquid flow is created at the posterior side of the chamber directly adjacent to the cascading flow from the primary lip. This reversing flow subsequently cascades posteriorly with respect to the chamber, over the secondary lip 29b.

Importantly, the reversing and opposing flow of water within the chamber 107 functions to separate and retain solids in the convoluted flow around the pipe 103 in order to allow them to be extracted by a series of inlet holes (not shown) provided in the inlet pipe 103.

The arrangement of the inlet holes is such that the holes are located at spaced apart intervals along the anterior surface of the pipe 103, the holes being relatively closely spaced apart at, for example, 50 millimetre intervals at the end of the pipe farthest from the services end 101 of the tank system, and gradually increasing in spacing to, for example 200 millimetres apart at the proximal end of the pipe 103 to the services end 101. The inlet holes are typically of a diameter of 8 millimetres, however all of these dimensions may vary, depending upon the particular flow rate of the water through the prefilter 104, desired to be achieved and the particular type of aquatic life that is accommodated within the main tank 11.

The prefilter 104 is disposed immediately adjacent to the 'v-shaped' upper drip tray 47, which accommodates a replaceable water permeable mat (not shown) therein. The upper drip tray 47 is positioned so that the anterior side of the 'v' is contiguous with the posterior side of the secondary lip 29b, whereby the reversing flow of water cascades over the secondary lip and onto the mat. As shown in FIG. 5 of the drawings, the posterior of the secondary lip 29b forms a flap which surmounts the mat and the anterior side 47a of the tray. The chamber 107 and the tray 47 are supported in position by a plurality of cross-braces 108 which transversely span the top of the filtering area 17. Each cross-brace 108 is fixed at one end to the partition 13 and at the other end to the outer side wall 11a of the main tank 11. The top of each cross-brace 108 is particularly configured so as to define a rectangular recess adjacent to the partition 13 to seat the chamber 107 therein and a 'v-shape' recess intermediate the remaining portion of the brace, closer to the side wall 11a to seat the upper tray 47 therein.

The upper drip tray 47 is provided with a plurality of holes along the posterior side 47b of the 'v'. These holes are provided at various locations along the side 47b to allow for the transfer of water gravitating through the mat, into the filtering area. The tray is also provided with a series of posterior flaps 47c which surmount the top of the outside wall 11a of the main tank 11 at periodical locations along the longitudinal extent of the wall. In this manner, rectangular shaped recesses 48 are defined between the flaps 47c, the recesses having an inner end sufficiently spaced from the inner edge of the wall 11a so as to maintain a gap 43 within the filtering area 17 adjacent to the inner surface of the wall 11a. The gap 43 is provided and maintained by the recesses 48 for venting $CO_2$ gases and the like from the filtering area, which are the by-products of the active bacteria of the biofilter.

The cross-braces 108, chamber 107 and tray 47 are all made from plastic. The cross-braces are spaced apart sufficiently to support the weight of the chamber 107 and tray 47 when they are filled with water.

The area beneath the chamber 107 and the drip tray 47 is filled with bioballs 32 to a height below the cross-braces 108, which are covered by a planar perforated lower drip tray 34. The lower tray 34 is covered with a plastic membrane and is divided into separate trays which span the entire longitudinal extent of the filtering area 17. The lower trays 34 have a transverse extent in order to enable them to abut against the inner side wall of the partition 13 along one side, but remain spaced from the inner surface of the outside wall 11a at their other side, so as to maintain the gap 43 between the tray and the wall 11a.

The bottom of the filtering area 17 has two pipes sequentially disposed in axial alignment, intermediately spaced between the outside wall 11a and the partition 13. The pipe closer to the services area end 101 of the tank system serves as a water suction line 61 for draining the filtering area of liquid from the bottom of the area 17. The other pipe serves as a water balancing line 62 between the filtering area 17 and the buffer tanks 19 and will be described in more detail later. Both lines 61 and 62 foim part of the network of pipes which is ultimately connected to the main pumps 21a and 21b via the buffer tanks 19, in a manner that will be described in more detail later.

The air outlet pipe 59 is also disposed towards the bottom half of the filtering area 17, but at an elevated position with respect to the water suction line 61 and at a position proximate to the outer wall 11a. The air outlet pipe 59 extends substantially the entire longitudinal extent of the filtering area 17a in spaced parallel relationship to the water suction line 61 and water balancing line 62, and is provided with a series of outlet nozzles (not shown) through which air, or preferably oxygen, supplied under pressure from the compressor 106 is injected into the filtering area. Accordingly, the compressor 106 is connected to the end of the outlet pipe 59 proximal to the services area 101 by means of an air pipe 60 disposed in the services area 101.

Operation of the biomass is enhanced by the supply of air or oxygen thereto. accordingly, the air outlet nozzles are disposed rectilinearly along the air outlet pipe 59 at an oblique angle relative to the vertical and horizontal, so as to inject air or oxygen into the biofilter 31 transversely across the filtering area 17 towards the partition 13. The direction of the nozzles has an upward component so as to reflect off the wall of the partition and be vented ultimately through the gap 43 provided adjacent the inner surface of the outside wall 11a. Consequently, air or oxygen is able to rise up through the water within the biofilter and permeate the biomass, air stripping ammonia from the water therein.

In the present embodiment a secondary outlet/inlet pipe 59a is also provided in the filtering area 17 and is connected to a corresponding pipe 60a at its proximal end to the services area. This pipe 60a can be optionally connected to the compressor 106 and act as a second air outlet pipe for cleaning purposes. In normal operation, however, it is disconnected from the compressor. Alternatively, the outlet/inlet pipe 59a can be connected differently to recirculate fluid through the biofilter 31 and keep the bacteria alive, in a shutdown or transport mode of the main tank system.

Moreover, in this shut down or transport mode, the outlet/inlet pipe 59a acts as a fluid inlet pipe to drain liquid from the bottom of the biofilter 31. In this arrangement, the pipe 60a is connected to the inlet of the auxiliary pump 102 and the outlet of the auxiliary pump is disconnected from the protein skimmer 25 and in turn is connected to the suction pipe 103 in the chamber 107, reversing the function of the suction pipe 103 to constitute a fluid outlet pipe. Consequently, operation of the auxiliary pump 102 draws fluid from the bottom of the biofilter and feeds it into the chamber 107 to subsequently spill over the secondary lip 29b and into the upper drip tray 47 to subsequently gravitate through the biofilter.

In this condition, the remainder of the tank system is shut down, without water being circulated through the holding tank 15 into the biofilter.

In an alternative arrangement still, in the shut down or transport mode, the main pump 21a can simply be cut down to an operational speed of 25% of its main speed, which is sufficient to cause a minimal recirculation of fluid through the biofilter in order to keep the biomass alive. Reduction of the speed of the main pump down to 25% of its optimum speed causes a massive reduction in power usage of the tank system making it an extremely viable arrangement in which to run the system in a shut down or resting mode.

The water suction line 61 is connected to what essentially constitutes at its proximal end a manifold 109 in the services area 101. The manifold 109 includes a pair of branches 109a and 109b, which are respectively connected to the inlet lines 110a and 110b of the motors 21a and 21b respectively. As is shown in FIG. 2, the branch 109a and the inlet pipe 110a effectively constitute the same pipe.

The manifold 109 is also fed by respective outlet pipes 80a and 80b connected to the buffer tanks 19a and 19b respectively. The buffer tank outlet pipes 80 are each connected to the manifold 109 by way of stop valves 81a and 81b respectively. The stop valves 81 operate in the event of a power failure to close the outlet pipes 80a and 80b and maintain the level in the buffer tanks 19a and 19b and thus the level of water in the biofilter 31.

In order to achieve this effect, the buffer tanks 19 are interconnected by a balancing manifold 82 at the opposite end of the main tank 11 relative to the services area 101. This balancing manifold has two arms, one arm 82a connected to the distal end of the buffer tank 19a and the other arm 82b connected to the distal end of the buffer tank 19b. A common branch 82c of the manifold is connected to the water balancing line 62, which functions to provide a common supply of fluid to the buffer tanks 19 from the bottom of the filtering area and balancing of the water levels between the buffer tanks and the biofilter 31.

In normal operation, water within the filtering area 17 is kept at a threshold level so that it may not backflow through the biofilter 31 and over the lips 29 into the holding tank 15 by means of the buffer tanks 19a and 19b, as an adjunct to the recirculating means. This is achieved by the buffer tanks 19a and 19b each being connected to the bottom of the filtering area 17 by the respective passageways described above. Thus, water can flow in either direction along these passageways in order to ensure that the water level within the area 17 does not exceed a prescribed threshold level, notwithstanding surges in the volume of water flow through the biofilter 31, which will occur when introducing product into the holding tank. This prescribed threshold level is controlled by the buffer tanks being disposed in substantial horizontal alignment with the filtering area 17, as shown in the drawings, and the buffer tanks being provided with sufficient headroom to maintain the prescribed threshold level below the top of the biofilter 31. Thus, the water level within the buffer tanks will rise and fall, depending upon the volume of water flowing through the biofilter, to ensure that the water level within the area 17 essentially does not rise above the height of the buffer tanks.

In practice, as additional product is loaded into the holding tank 15, excess water flows over the lip 29 into the biofilter 31. The excess water flows into the buffer tanks via the interconnecting passageways to avoid backflow of water through the biofilter 31. When the product is removed from the holding tank, the main pump 21 continues to draw from the water in the bottom of the filtering area 17, and thus the buffer tanks 19 allow water to flow back into the filtering area and thus back into the holding tank to replace the water which was displaced by the product. Once the holding tank is filled with sufficient water, the water will cascade over the lips 29 again to maintain the cross-flow of water within the holding tank, and continuous down flow of water through the biofilter.

The buffer tanks 19 are each partitioned into three discrete compartments 83. The compartments are arranged sequentially from the distal end of the tank system to the proximal end of the tank system, relative to the services area end 101. Consequently, there is a distal compartment 83a, an intermediate compartment 83b and a proximal compartment 83c in each buffer tank. The partitioning of the buffer tanks into compartments graduates the flow of water from the manifold 82, through the respective distal compartments 83, and eventually into the proximal compartments 83c. It is then outlet via the outlet pipes 80a and 80b and inlet to the manifold 109 for pumping by the main pumps 21a and 21b.

Additional filtering and pH levelling can be undertaken conveniently in the compartments of the buffer tanks. Moreover, appropriate filtering means, such as coral, sponge and limestone rocks are disposed in one or more compartments. In the present embodiment, the intermediate compartment 83 of the buffer tank 19b is used for this purpose.

Additionally, the buffer tanks can be used to gauge the level of water in the biofilter 31 and allow for water to be supplied to the system in order to maintain and/or increase the level of water in the biofilter at periodical times.

In the present embodiment, the proximal compartment 83c of the buffer tank 19b is provided with a water level marker and float level control (not shown). The water level marker is used to gauge the level of water in the biofilter 31 and the float level control is connected to the controller to introduce water into the system and/or inform an operator of water loss which may require resetting of the tank's parameters.

Each of the compartments 83 are provided with a lid to enable access to the contents thereof, which lid can provide an elevated platform in the closed position for walking along and accessing the contents of the holding tank 15, when required.

The network of pipes connected to the main pumps 21 is completed to provide the recirculating means of the tank system. In this regard, respective outlet pipes 65a and 65b of the pumps 21 are connected via stop valves 85a and 85b respectively to a pair of water inlet lines 67a and 67b which are situated in the holding tank 15.

The water inlet lines 67a and 67b form the water inlet means of the tank system and comprise pipes extending longitudinally of the holding tank from the proximal end to the distal end thereof. The water inlet line 67a is disposed at the bottom of the holding tank proximate to the partition 13, whereas the water inlet line 67b is oppositely disposed at the bottom of the tank proximate to the outside wall 11b of the tank.

Both of the inlet lines 67 are provided with a series of inletting nozzles comprising holes formed rectilinearly in the pipes so as to inlet water under pressure into the holding tank and create a uniform, circulating flow of water therein about a substantial horizontal axis. Accordingly, the nozzles of the water inlet line 67b are disposed to inject water at an oblique angle relative to the horizontal and vertical, in a substantially upward direction and transversely across the holding tank towards the partition 13. The nozzles in the inlet line 67a are similarly disposed but direct water at an oblique angle having more of a horizontal component and towards the outside wall 11b. In this manner, both pumps can be operated to create a rapid cross-flow of water within the holding tank to optimise the aquatic environment for aquatic animals within the tank.

The position of the water inlet lines 67 relative to the discharge means is particularly important in that it allows for an optimum circulation of water flow within the holding tank 15 itself. Moreover, the water inlet lines are disposed opposite to and extend generally parallel with the tank discharge means and have their inletting nozzles directed so that water tends to move in a circular cross flow manner about a substantially horizontal axis. Thus water, when jetted from the water inlet lines 67, tends to flow up along the inner face of the outer wall 15a towards the surface of the water 23, then from the inner wall 15a to the partition 13 along the top of the holding tank so that part of the water cascades over the primary lip 29a and part of the water continues to circulate down along the inner wall 13b of the partition 13 towards the bottom of the holding tank, and then across the bottom of the tank 15b to the inner wall 15a. This circulatory motion tends to avoid the creation of dead spots and allows a uniform cross flow of treated water throughout the holding tank, equally sustaining aquatic animals disposed at any location within the tank.

Figure 6:
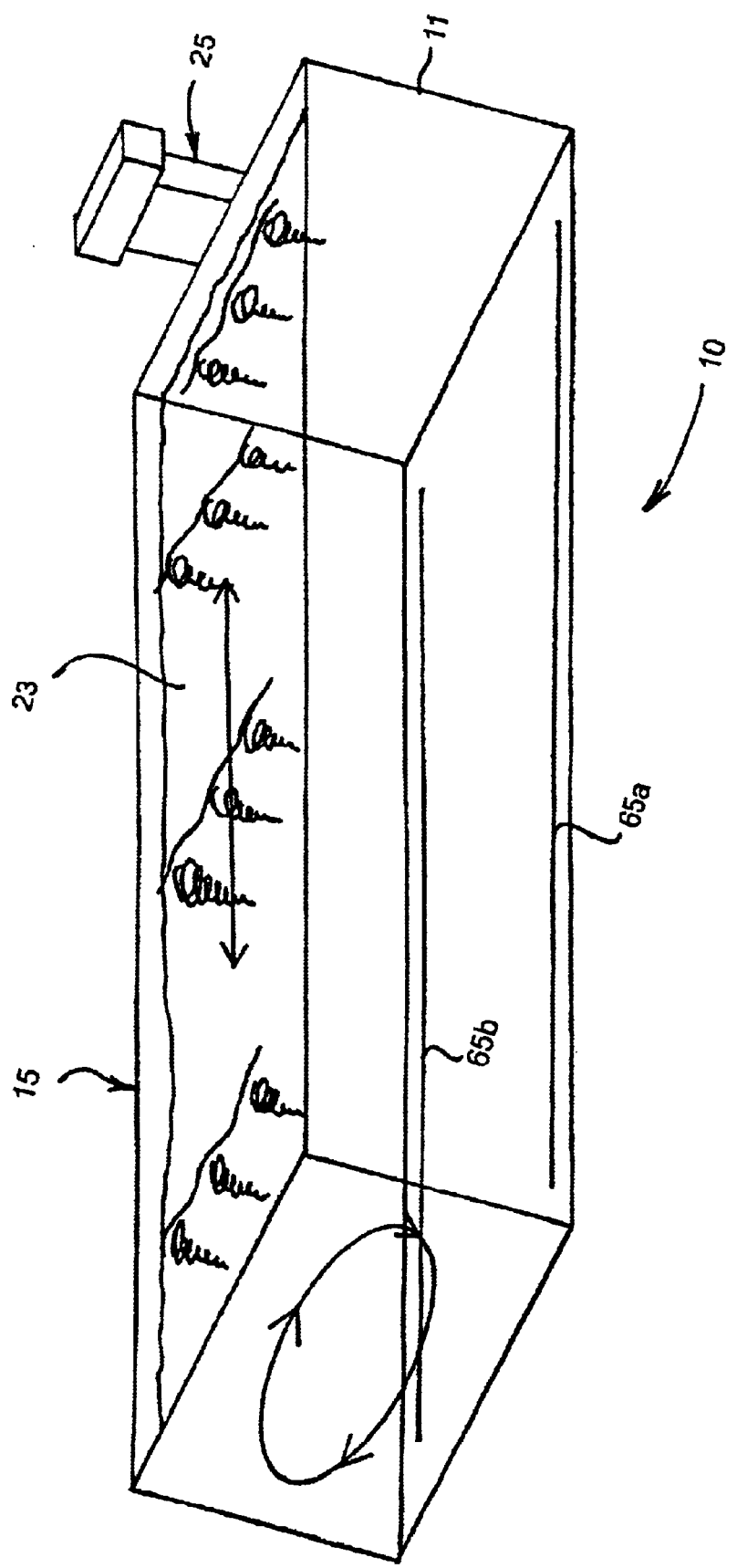
FIG. 6 is a schematic isometric view of the holding tank showing the uniform circulatory cross-flow of fluid and the location of ephemeral eddy currents as a result of the latent axial flow of fluid and reflection of same within the holding tank.
Figure 7:
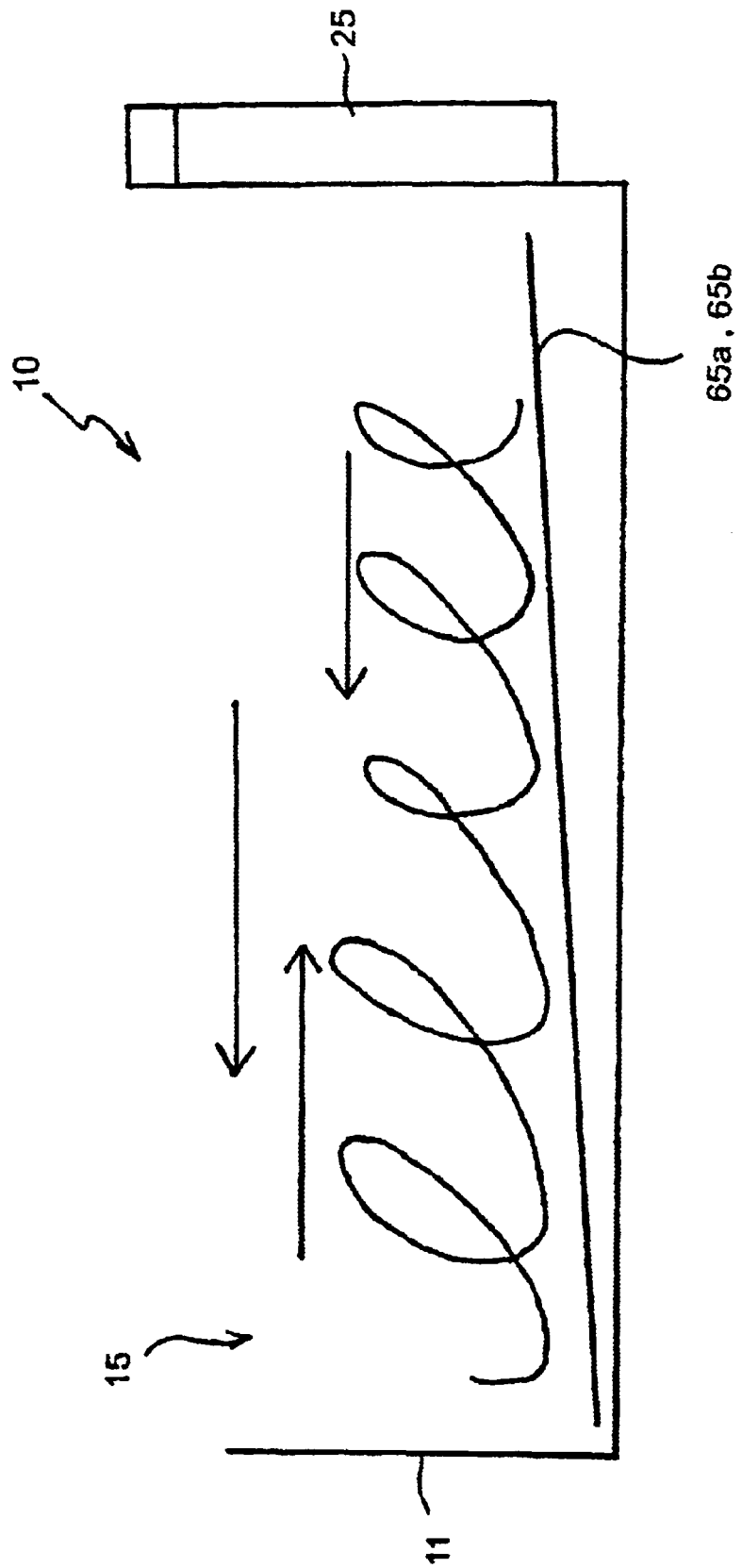
FIG. 7 is a schematic side elevation of the holding tank showing the spiralling effect of the latent axial flow of fluid relative to the horizontal axis about which the uniform, circulatory cross-flow of fluid is created.

A particular aspect of the present embodiment which is best illustrated in FIGS. 6 and 7, is that the water inlet lines 67a and 67b respectively have rectilinear arrangements of inletting nozzles for jetting fluid into the holding tank, which extend longitudinally thereof. This rectilinear arrangement of inletting nozzles is disposed so as to be marginally offset from a true parallel relationship with the horizontal axis. This is most readily achieved by elevating both of the inlet lines within the holding tank at one end. In the present embodiment, as shown in FIG. 7 of the drawings, this is at the services end 101 of the main tank. In an alternative embodiment, the same effect may be achieved by disposing the inletting nozzles in a marginally helical configuration so that the nozzle at one end is directed at a more acute angular position relative to the bottom of the holding tank than the nozzle at the opposing end.

The former, however, is the preferred arrangement as better cross-flow is achieved.

This marginal offset from the horizontal generates a latent axial flow of fluid relative to the horizontal axis within the holding tank, directing the cross-flow spirally or helically about the central longitudinal axis of the holding tank.

Furthermore, in the present embodiment, the opposing end walls of the holding tank provide a surface to reflect the latent axial flow of fluid along the holding tank, thereby generating an axial back flow of fluid which interferes with the principal latent axial flow. This interference establishes a very subtle wave motion within the holding tank which manifests itself in generating transverse and vertically directed eddy currents at axially spaced apart locations along the surface of the holding tank. These eddy currents tend to focus cross-flow of fluid carrying suspended solids to the top of the holding tank and with the cross-flow of fluid to towards the tank discharge means directs suspended solids over the primary lip 29a, between successive locations of eddy currents. Suspended solids falling into an eddy current, conversely tend to be recirculated within the return cross-flow within the tank, being drawn away from the primary lip. These suspended solids are recirculated and are provided with another opportunity to flow across the surface between successive eddy currents to be focused towards the primary lip and extraction via either the prefilter or biofilter.

It should be noted that protein is always brought to the surface and tends to flow across the primary lip on a continuous basis regardless of the presence of eddy currents.

In normal operation, only the pump 21a is operated on a continuous basis and the pump 21b is operated on a periodical basis to increase water flow through the biofilter 31 to suit the conditions of the environment to be achieved. Accordingly, the particular duty cycle of the pump 21b can be altered to suit the particular species of animal accommodated within the tank and to stabilise the environment to suit the reconditioning of aquatic animals when first placed in the holding tank.

In order to drain water from the buffer tanks 19 and the filtering area, a water outlet pipe 49 is connected to the pump inlet pipe 110a via a stop valve 50 to divert water flow that normally flows to the pump 21a. In order to fill the holding tanks 15 with water, if required, a water inlet pipe 51 is connected to the outlet of the pump 21a and into the water inlet line 67a, via a stop valve 52. A separate water outlet drain (not shown) is provided in the end wall opposite the services area 101 in the holding tank, to drain water therefrom, when required. Accordingly, ingress and egress of water to and from the tank system is controlled by operation of the valves 50 and 52, which can be attended to either manually, or automatically via a controller (not shown) located within a controller housing 57. The controller will be described in more detail later.

The water inlet pipe 51 can be supplied by a mains pressure hose (not shown) and a standard solids/activated carbon filtration system (also not shown). The stop valve 52 would then be in the form of a solenoid valve controlled by the controller. The controller could then automatically close the system with fresh water in response to any detected increase in salinity arising from evaporation of fresh water. In this manner the amount of water within the system can be maintained at a predetermined level corresponding to a prescribed salinity.

The protein skimmer 25 is connected into a discrete protein circuit to supplement the filtering function of the biofilter 31. Moreover, the protein skimmer 25 functions to remove suspended solid materials from the holding tank such as shellfish excrement, detached limbs or the like, as well as protein, and performs a supplementary filtering and cleansing action to the biofilter. It operates by sucking water and solids from the prefilter via the suction line 103 and the auxiliary pump 102, passing the same through the main fractionation column 25a of the protein skimmer 25 where the water is injected with ozone and/or oxygen to entrain the solids within the resultant foam, and is then fractioned off before the filtered water is returned to the holding tank via suitable return means. The foam containing entrained protein and solids is expelled into a foam collecting chamber 25b, surmounting the fractionation column 25a, via an interconnecting passageway (not shown). Collected foam is outlet via foam outlet means (not shown) from the chamber, periodically.

The injection of ozone and/or oxygen through the water not only promotes the foam fractionation process but also treats any ammonia and nitrites in the water caused by the excretia of the aquatic animals converting it into a relatively inert nitrate form, which is harmless in the aquaria environment.

In the present embodiment, the suction pipe 103 is connected to the inlet of the auxiliary pump 102 via an inlet pipe 87. The outlet of the pump 102 is then connected via a branching circuit including a coupling to an upper inlet pipe 89a and a lower inlet pipe 89b, which are in turn connected to different levels of the fractionation column 25a to complete the inlet side of the protein circuit. Flow control valves 91 are connected to each of the branches of the branching coupling so that control valve 91a is provided along the inlet branch 89a, control valve 91b is provided along the inlet branch 89b and the control valve 91c is provided along the main outlet 89c of the auxiliary pump 102.

Aerating means in the form of a Venturi (not shown) is incorporated into the lower inlet branch 89b for introducing ozone into the fractionation column 25a.

The outlet side of the protein circuit comprises an outlet pipe 73 which connects the outlet of the fractionation column 25a, proximate the bottom thereof, to the discharge chamber 105. The outlet pipe 73 is also provided with a control valve 93 and a vent 95 to control the outlet flow of fluid therefrom and to vent gases such as ozone and oxygen introduced into the water during the foam fractionation process, on its way to the discharge chamber 105. The distal end 73a of the outlet pipe discharges fluid from the foam fractionator into the top of the discharge chamber 105.

Figure 4:
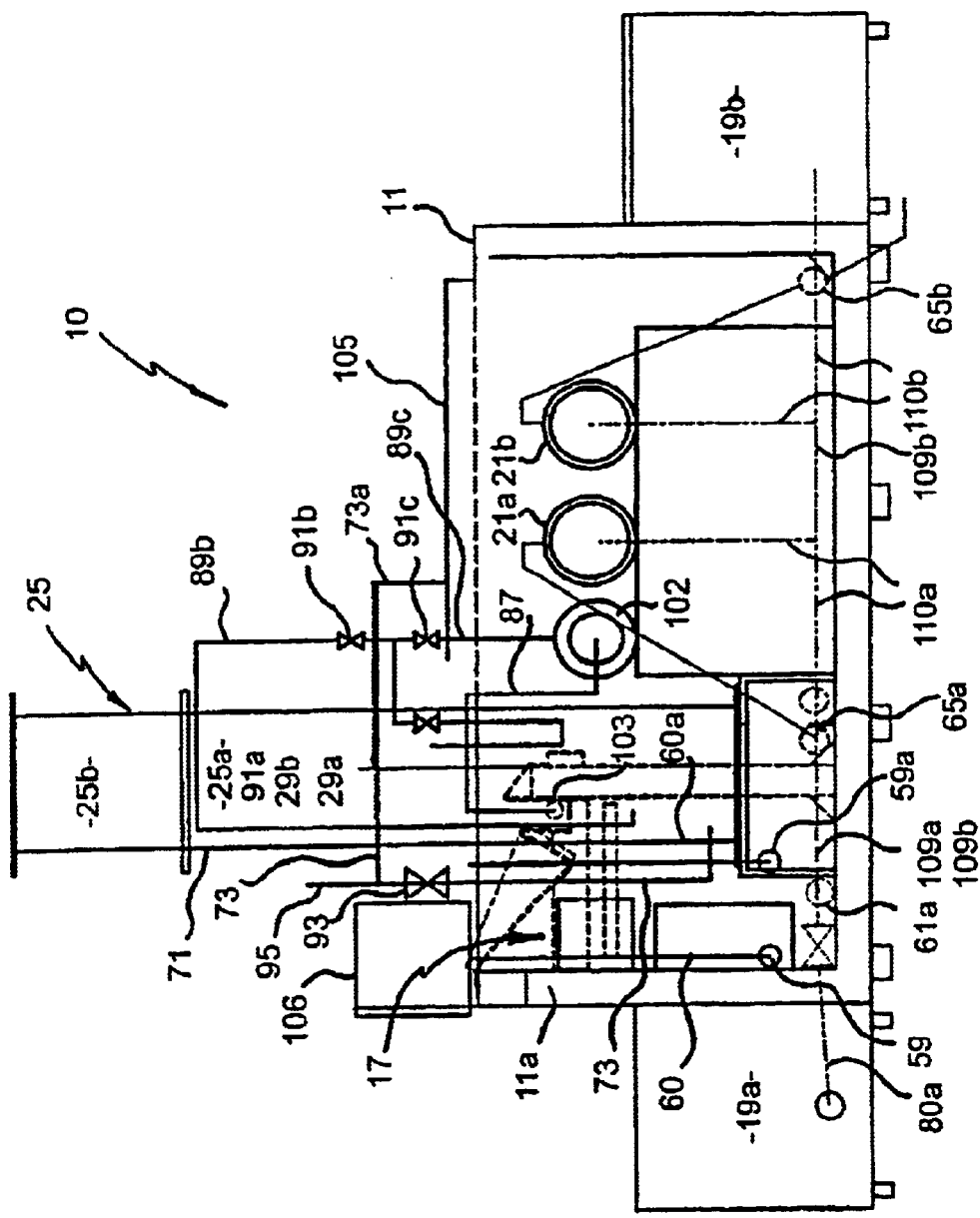
FIG. 4 is an end elevation of the tank system shown in FIGS. 2 and 3, taken from the services end of the tank.

The discharge chamber 105 is disposed at the end of the holding tank 11 adjacent to the services area end 101. As shown in FIGS. 2 and 4, the distal end 73a of the outlet pipe 73 discharges filtered fluid from the protein skimmer 25 into the discharge chamber 105, at the end of the chamber proximate to the filtering area 17. The opposing end of the discharge chamber 105 is formed with an upper discharge port 95 which overlies the end wall 11c of the holding tank adjacent to the services area 101. Thus, the top 105a of the discharge chamber is disposed at a level above the top of the partition 11c to accommodate an opening in the discharge port 95, through which water within the discharge chamber can cascade over the partition 11c and into the holding tank 15. The opposed location of the discharge port 95 and the distal end 73a of the outlet pipe 73 allows a further opportunity for degassing of gases and ozone entrained within the fluid outlet from the foam fractionation process.

The discharge chamber 105 also provides a convenient location to situate the evaporative coil 75 of the refrigeration system. Accordingly, the condenser and compressor (not shown) of the refrigeration system can be operated via a thermostat control (not shown), forming part of the controller, to adjust the temperature of water entering the holding tank via the discharge chamber. Thus, temperature control of the water within the holding tank can be maintained and reduced, if necessary, by controlled operation of the refrigeration system.

The entire system can be monitored and controlled by the controller within the controller housing 57. The controller includes a microcomputer system which is connected to suitable probes for measuring ORP (measurement of water quality), pH, salinity and temperature of the water within the system. An appropriate chemical dispenser (not shown) is provided to maintain optimum pH and salinity levels in accordance with a prescribed control program which is run by the controller. As previously described, the temperature of the water can be controlled by the controller using the refrigeration system previously described.

The controller housing 57 also includes a modem and telecommunication link (not shown) which allows for remote connection, monitoring and control of the tank system.

Although not shown in the drawings, the bottom 15b of the holding tank can have disposed therein a basket stand made from PVC or other appropriate material. The basket stand provides an elevated platform on which a plurality of baskets containing the aquatic animals, such as shellfish, may be disposed in a confined environment within the holding tank. The baskets may be stacked on and arranged in rows to substantially occupy the entire content of the holding tank 15.

The basket stand provides clearance between the bottom baskets and the bottom 15b of the holding tank to facilitate water circulation along the bottom of the holding tank.

The tank system 10 is of modular form, whereby the two buffer side tanks 19a and 19b are connected to the main tank by quick release couplings. This allows the buffer tanks to be removed and stacked on top of the main tank 11 for transport purposes. The pumps, biofilter 31 and all controllers are built onto the main tank 11. Thus, in order to install the tank system, it is simply a matter of locating the main tank and its components on the ground, connecting the buffer tanks to the main tank, filling the main tank with water, and connecting up an appropriate power supply to the various components.

In this manner, the system is quite portable, where it can be transported to virtually anywhere throughout the world.

An important feature of the system 10 is that the flow of water 23 from the holding tank 15 to the biofilter area 17 is effected by gravitation, whereby pumping is only necessary to transfer water from the bottom of the filtering area 17 to the water outlet line 67 in a substantially horizontal plane. Thus, it is not necessary to utilise a large capacity pump as has previously been necessary for transferring water in prior art tank systems.

The particular arrangement of the buffer tanks 19 also enables the buffer tanks to form a platform along which an operator may walk alongside the holding tank and tend to product therein. In addition, the modular nature of the system allows for it to be connected up in parallel whereby a plurality of tank systems may be disposed alongside each other to increase the product capacity.

Figure 8:
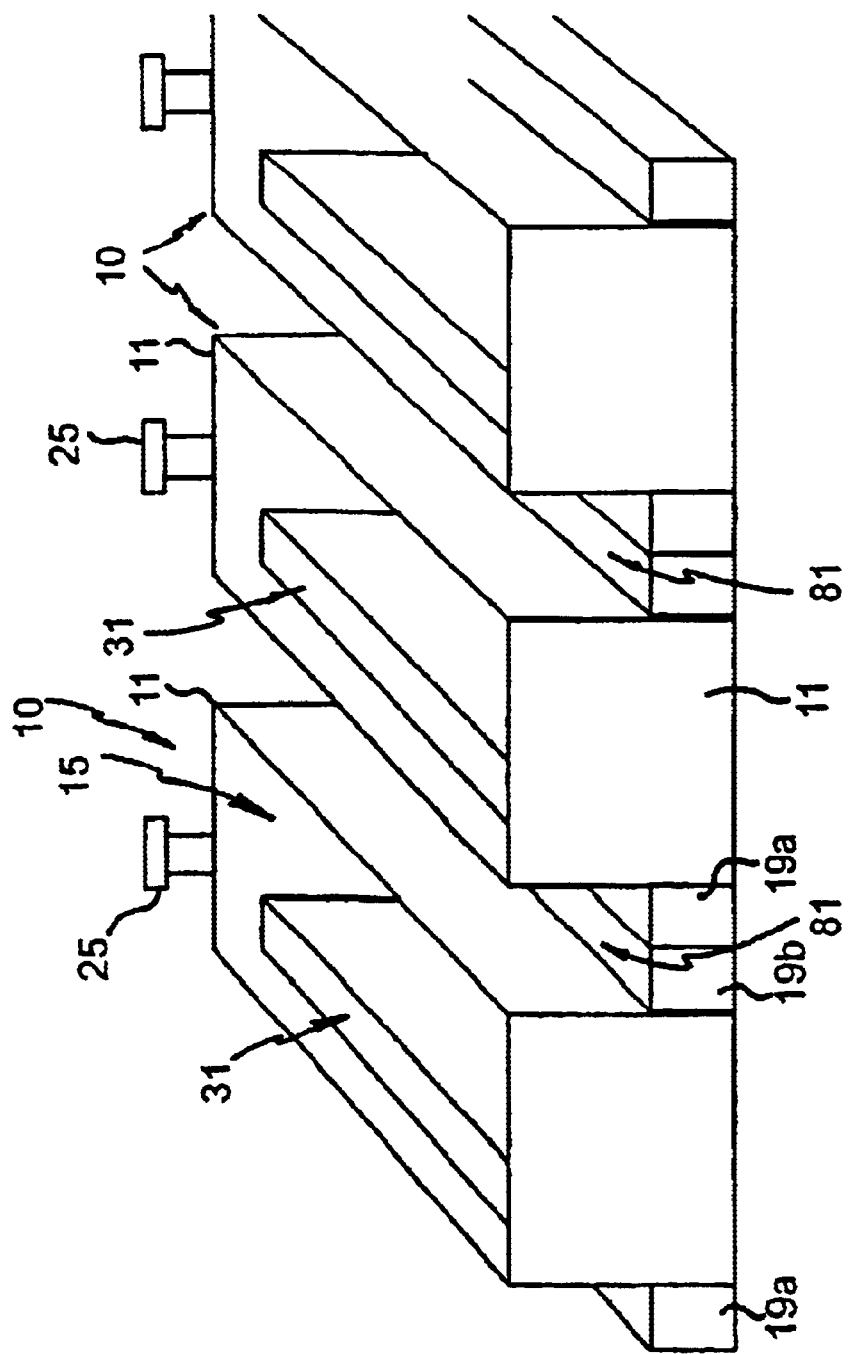
FIG. 8 is a schematic isometric view showing the location of three tank systems operated in parallel to each other, in accordance with the first embodiment.
Figure 9:
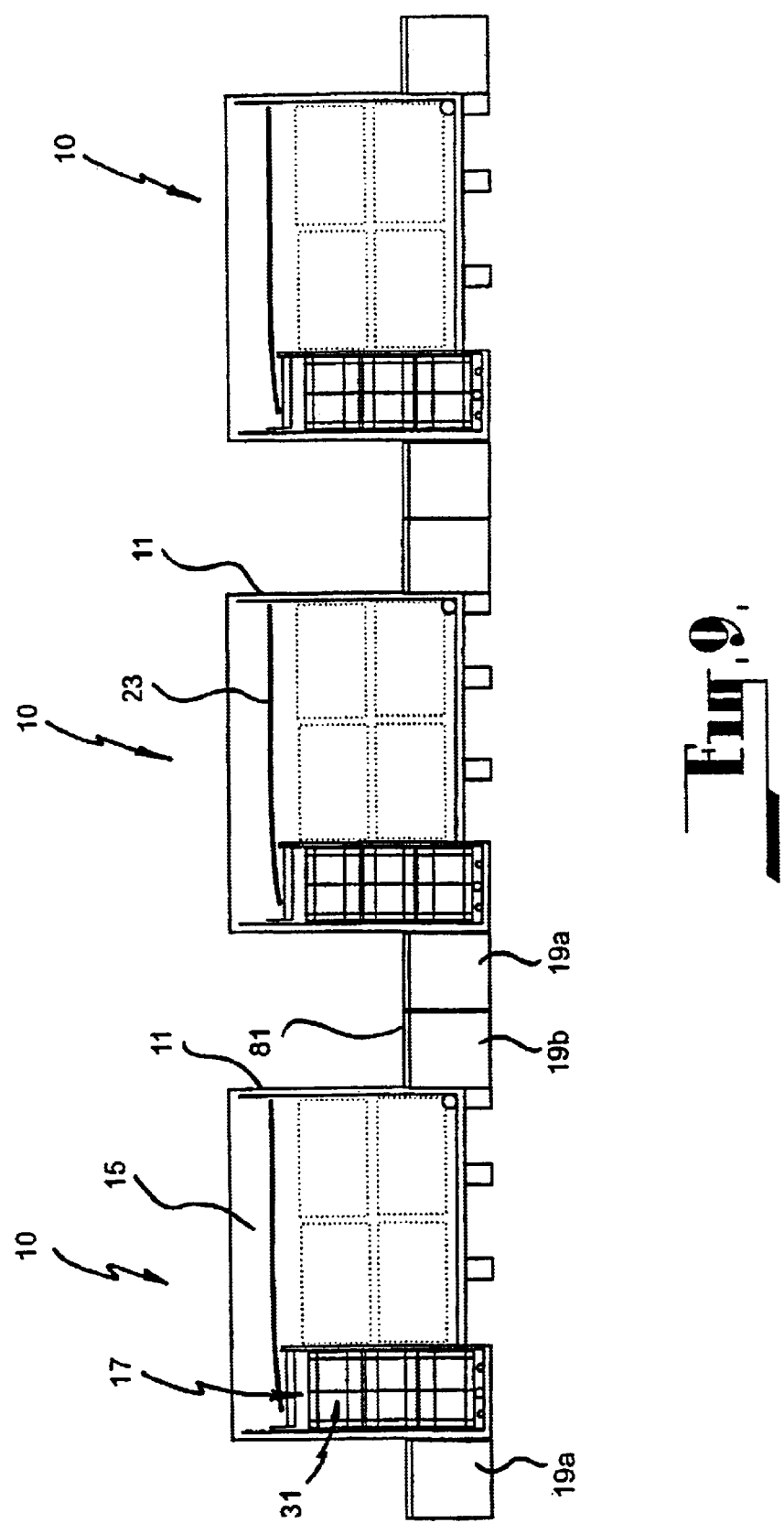
FIG. 9 is a cross sectional end view of the three tanks as shown in FIG. 8.
Figure 10:
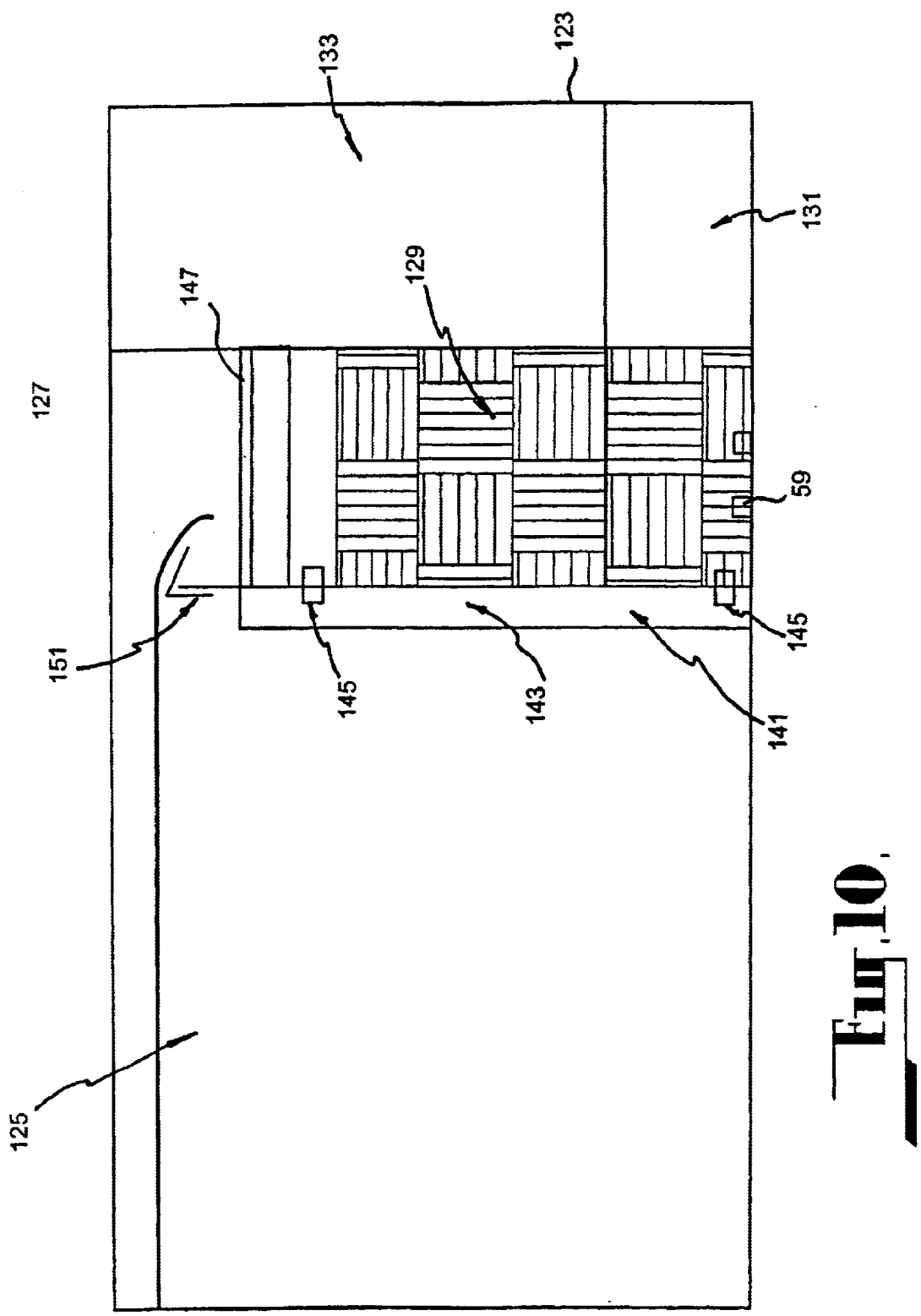
FIG. 10 is a schematic cross sectional elevation of a smaller version display and research tank system in accordance with the second embodiment.
Figure 11:
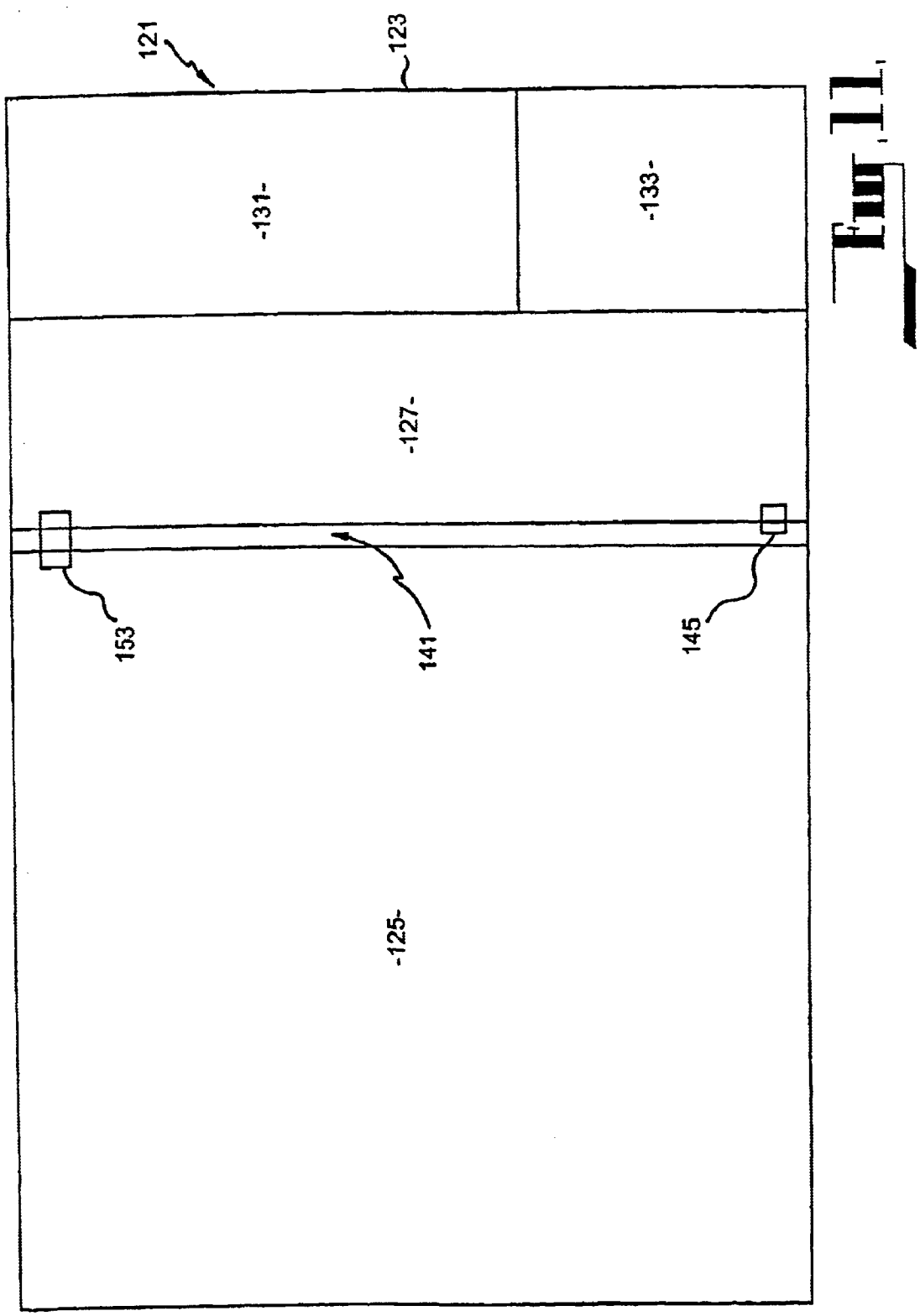
FIG. 11 is a plan view of FIG. 10.

As shown in FIGS. 8 and 9, three discrete tank systems are shown disposed alongside each other whereby adjacent buffer tanks 19a and 19b of adjacent systems combine to form a single platform 81 along which an operator may walk to access the contents of the holding tank 15 or the biofilter 31.

The second embodiment is substantially similar to the first embodiment in principle, but differs from the tank system of the first embodiment, principally in terms of scale, being much smaller, and intended for display and research purposes.

As shown in FIGS. 11 to 17, the tank system 121 comprises a main tank enclosure 123 which houses essentially all of the components of the tank system, including the holding tank 125, the filtering area 127 and biofilter 129, a single buffer tank 131 and a machinery space 133 for containing the various operating components of the tank system.

As can be seen in the plan views, the basic arrangement of the tank system is divided into three transversely extending sections, the first being the holding tank 125, the second being the filtering area 127 and the third being the buffer tank 131 and the machinery space 133.

Figure 12:
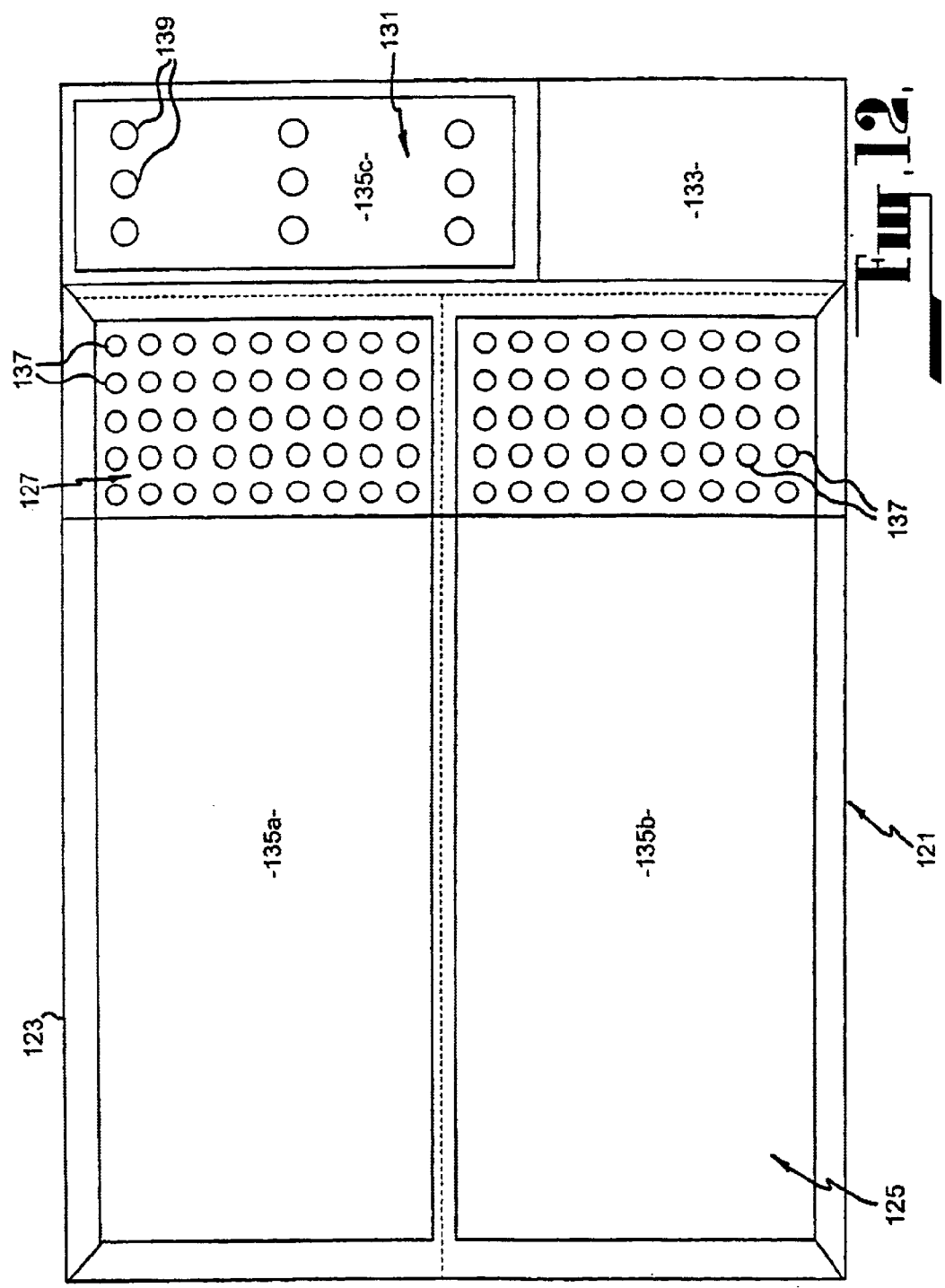
FIG. 12 is a similar view to FIG. 11 but showing the lids in place.
Figure 13:
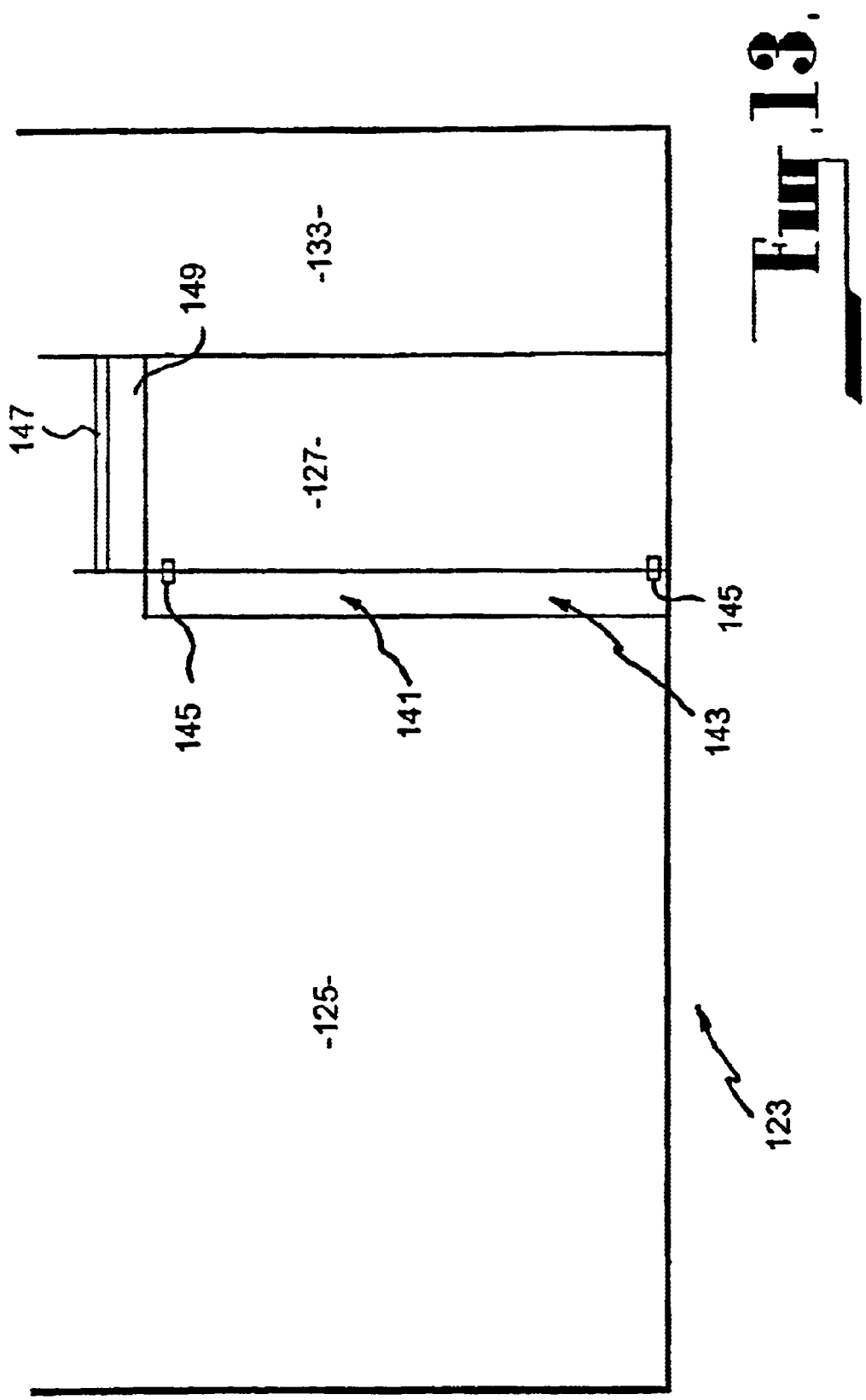
FIG. 13 is a schematic side elevation showing the relative dimensions of the tank system and the arrangement of certain elements thereof in accordance with the second embodiment.

As shown in FIG. 12 of the drawings the top of the tank system is covered by three lids, two lids 135a and 135b being disposed over the holding tank 125 and the filtering area 127, and a third lid 135c being disposed over the buffer tank 131.

That portion of the lids 135a and 135b covering the filtering area 127 has holes 137 formed therein to allow for venting of $CO_2$ and nitrate from the biofilter 129.

Figure 14:
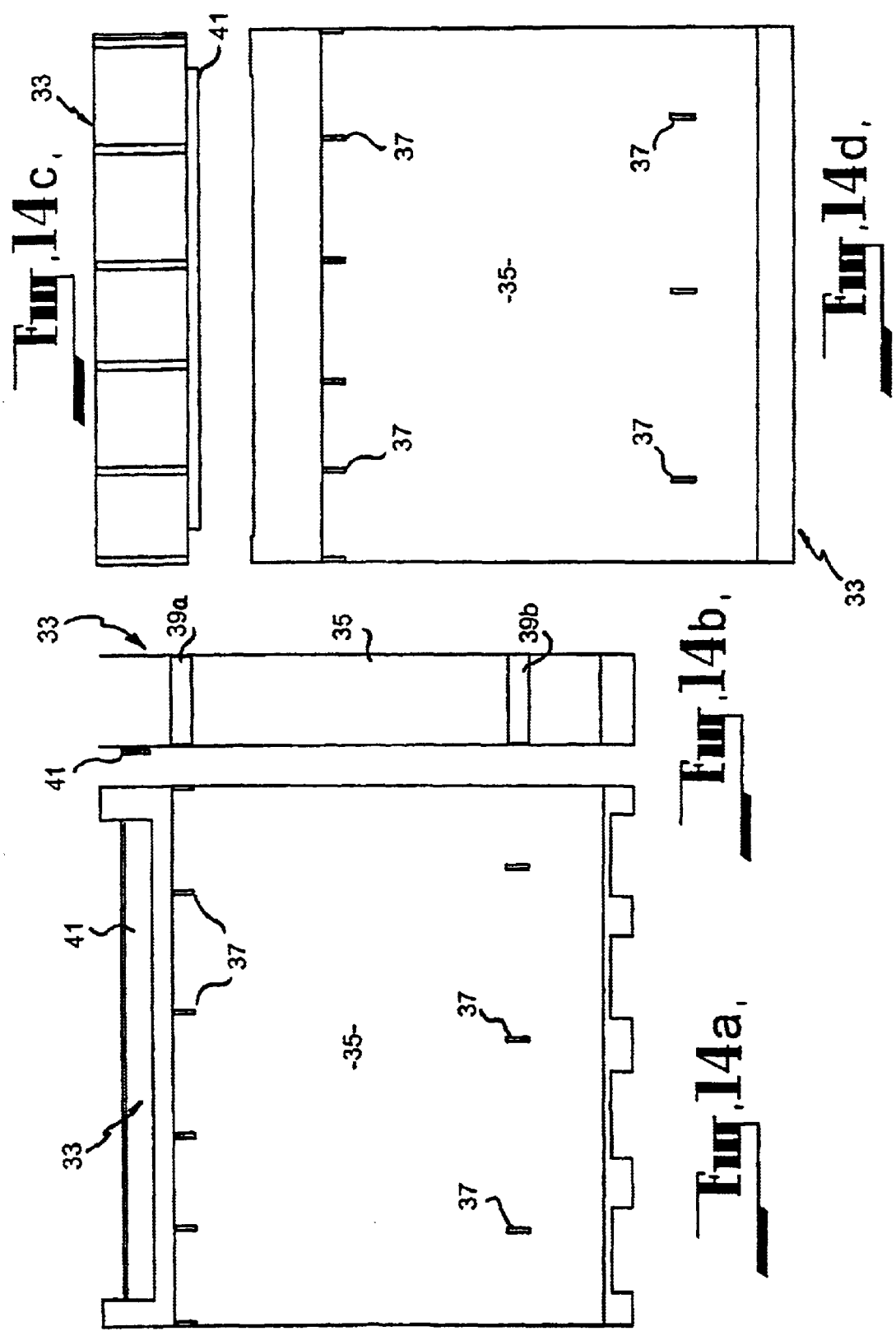
Figure 15:
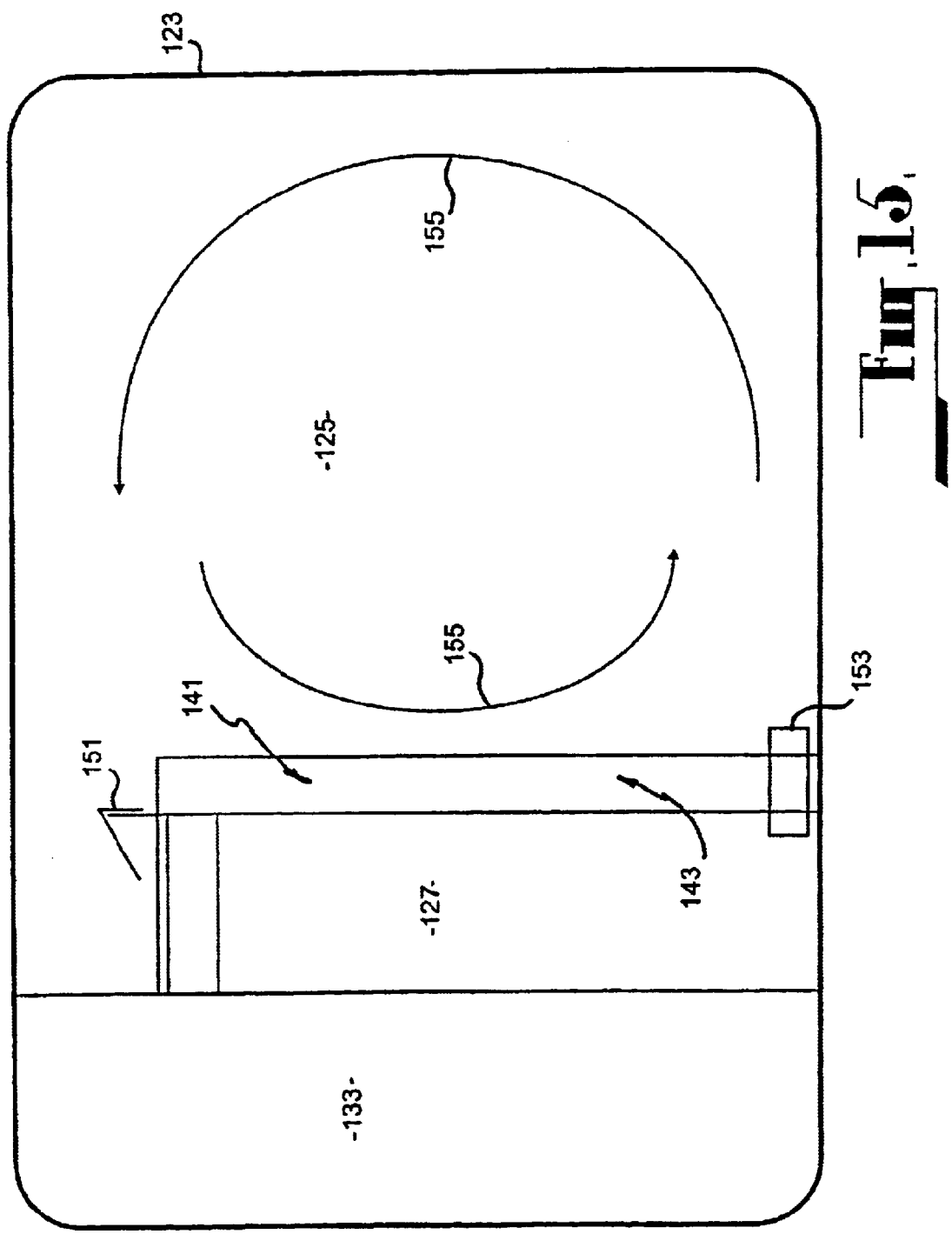
FIG. 15 is a schematic side view of the tank system similar to that of FIG. 13, but viewed as of the other side of the tank.
Figure 16:
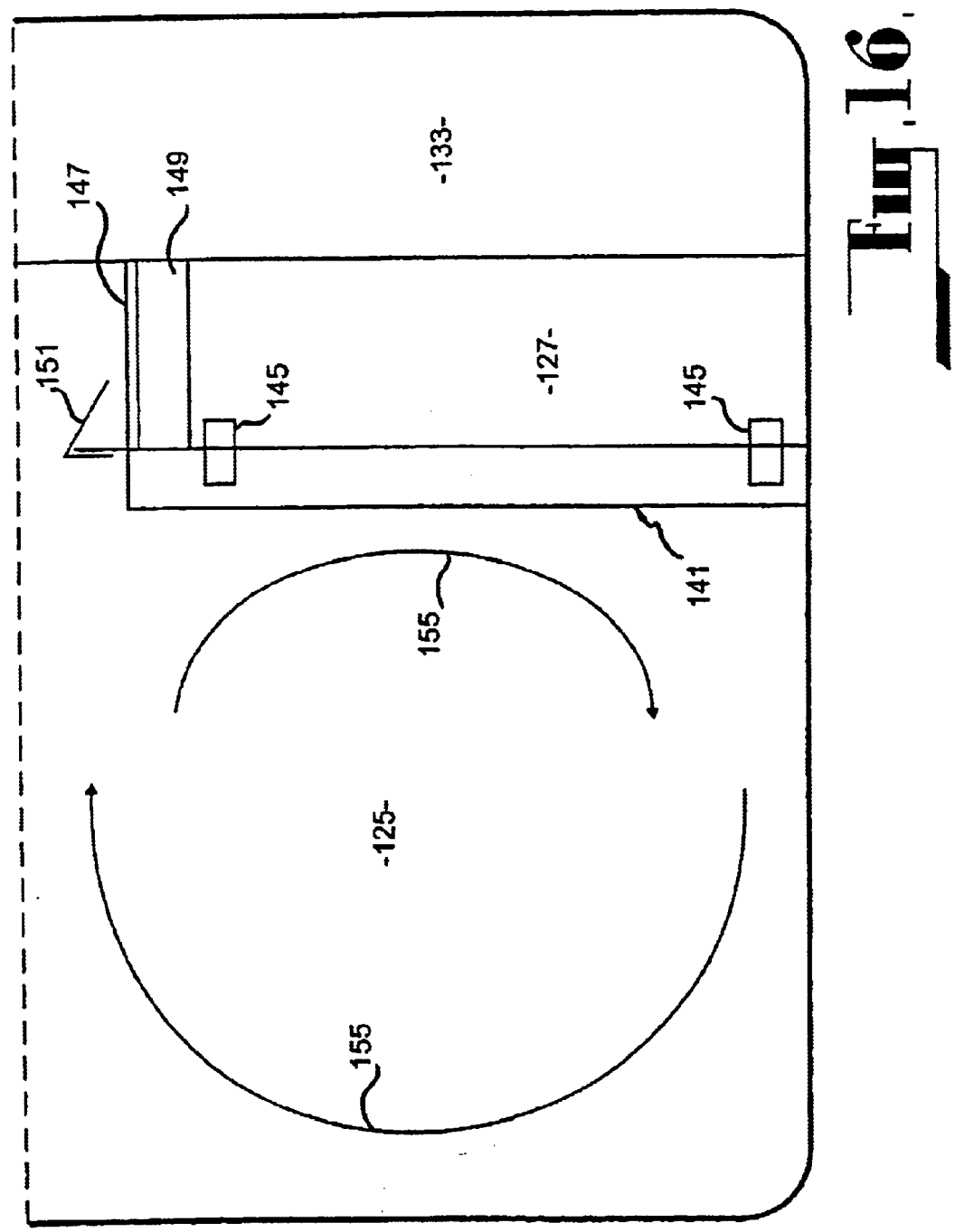
FIG. 16 is a similar view to FIG. 13, but showing more detail.

In the present embodiment, the biofilter 129 has bioballs housed within discrete elements 33 of the type shown in FIGS. 14, which may be clipped in to position within the filtering area 127. Thus a plurality of these elements 33 can be positioned in this way to occupy substantially the entire area 127.

The biofilter elements 33 are formed with an external plastic casing 35 which is permeated with holes 37 at appropriate locations in order to allow water to enter and gravitate down through the element. The bioballs 37 are housed within the casing between two layers 39a and 39b of permeable material, respectively disposed at the top and the bottom of the casing.

A clip 41 is provided along the rear side of the element 33 adjacent to the top to facilitate clipping the element to a series of hooks (not shown) which are formed along the confronting face of the partition 131, bounding the area 127 of the filtering means. Accordingly, the elements 33 can be clipped into position to occupy essentially all of the volume of the area 127 and to allow discrete removal of elements for maintenance purposes when necessary. A small gap is provided between adjacent elements to allow for the venting of carbon dioxide ($CO_2$) which is a main by-product of the active bacteria of the biofilter.

The lid 135c also has a series of holes 139 provided therein, but not as closely spaced as the holes 137, to allow for breathing of the buffer tank 131.

The partition 141 is arranged so as to be provided with a refrigeration void 143 within which the condenser coil (not shown) may be disposed. Accordingly, appropriate refrigeration sockets 145 are provided to allow for communication with the water passing through the biofilter 129 to cool the same.

The drip tray 147 is mounted upon a series of drip tray supports 149. The lip 151 in the present embodiment is affixed to the top of the partition 141 so as to form a V-shape knife edge over which water may cascade into the drip tray 147 and down through the biofilter 129 as required.

The remaining features of the tank system 121 are essentially the same as those provided in the first embodiment and accordingly corresponding reference numerals are used in the drawings to identify like features.

As compared with the preceding embodiment, the arrangement of the recirculating means is marginally different, whereby a water transfer socket 153 is provided at the bottom of the partition 141 to interconnect the water inlet pipe 154 within the holding tank 125 and the main pump 152. The socket 153 is sealed from the contents of the refrigeration void 143.

Figure 17:
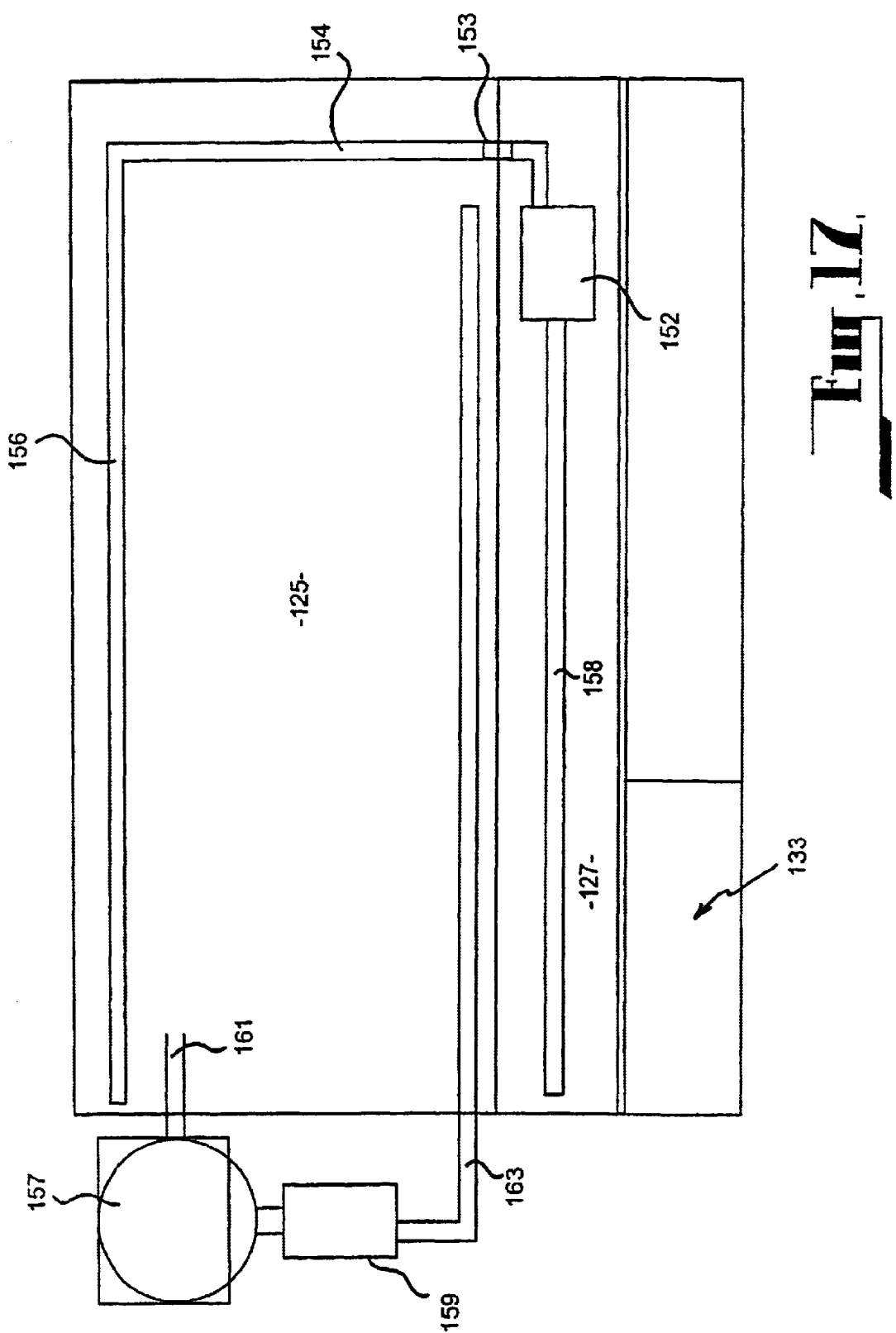
FIG. 17 is a schematic plan view showing the arrangement of the primary filtration system and the holding water recirculation system in accordance with the third embodiment.
Figure 18:
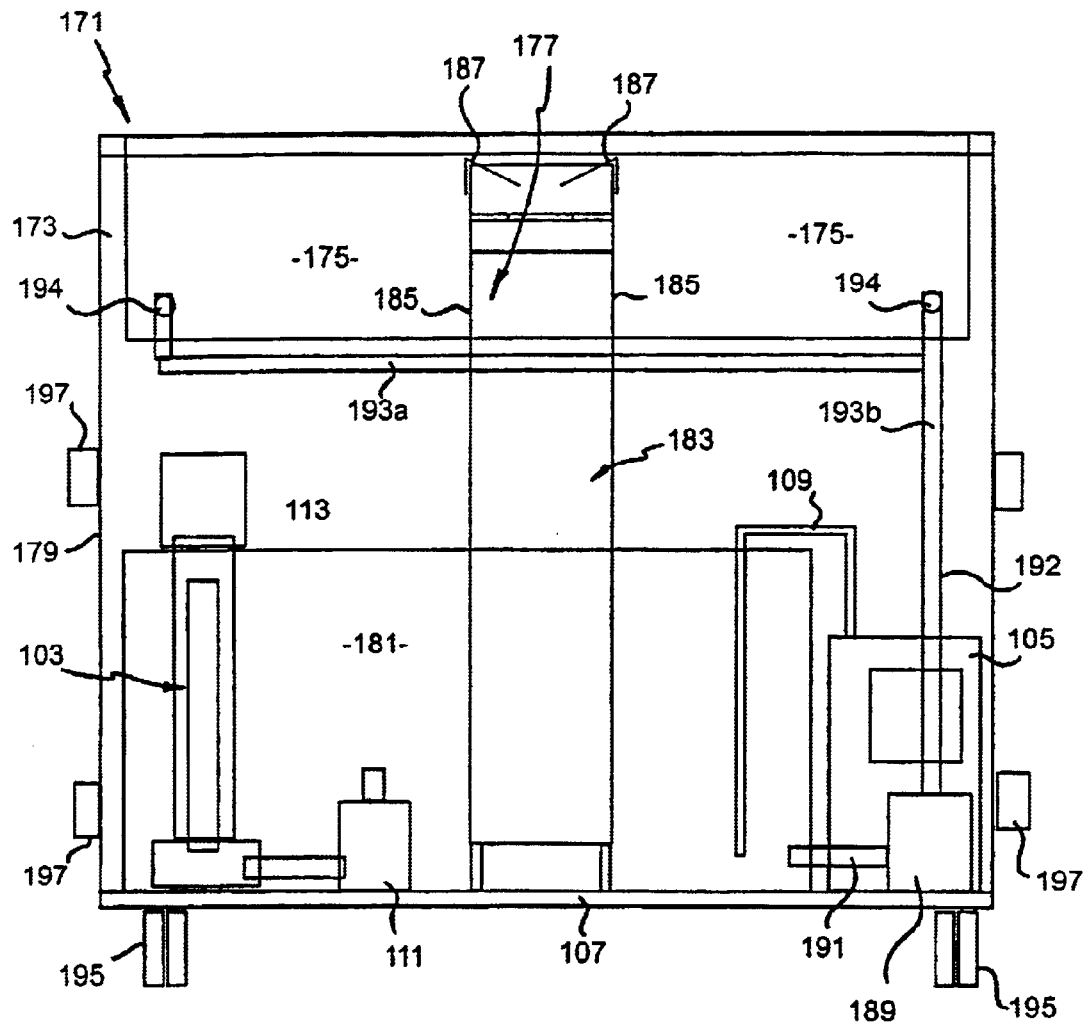
FIG. 18 is an end view of an alternative tank system in accordance with a third embodiment for displaying and holding shellfish in holding tanks disposed on either side of the biofilter.

The water inlet pipe 154, as shown in FIG. 17, is connected to the socket 153 and projects in a L-shape manner to provide a longitudinally extending nozzle pipe 156 at a diagonally opposed location to the lip 151. In order to achieve a uniform cross flow of water within the holding tank 125, as represented by the arrows 155. The main suction pump 152 is a submersible pump and has an inlet suction pipe 158 connected thereto which extends longitudinally along the bottom of the filtering area 127 beneath the biofilter 129.

Figure 19:
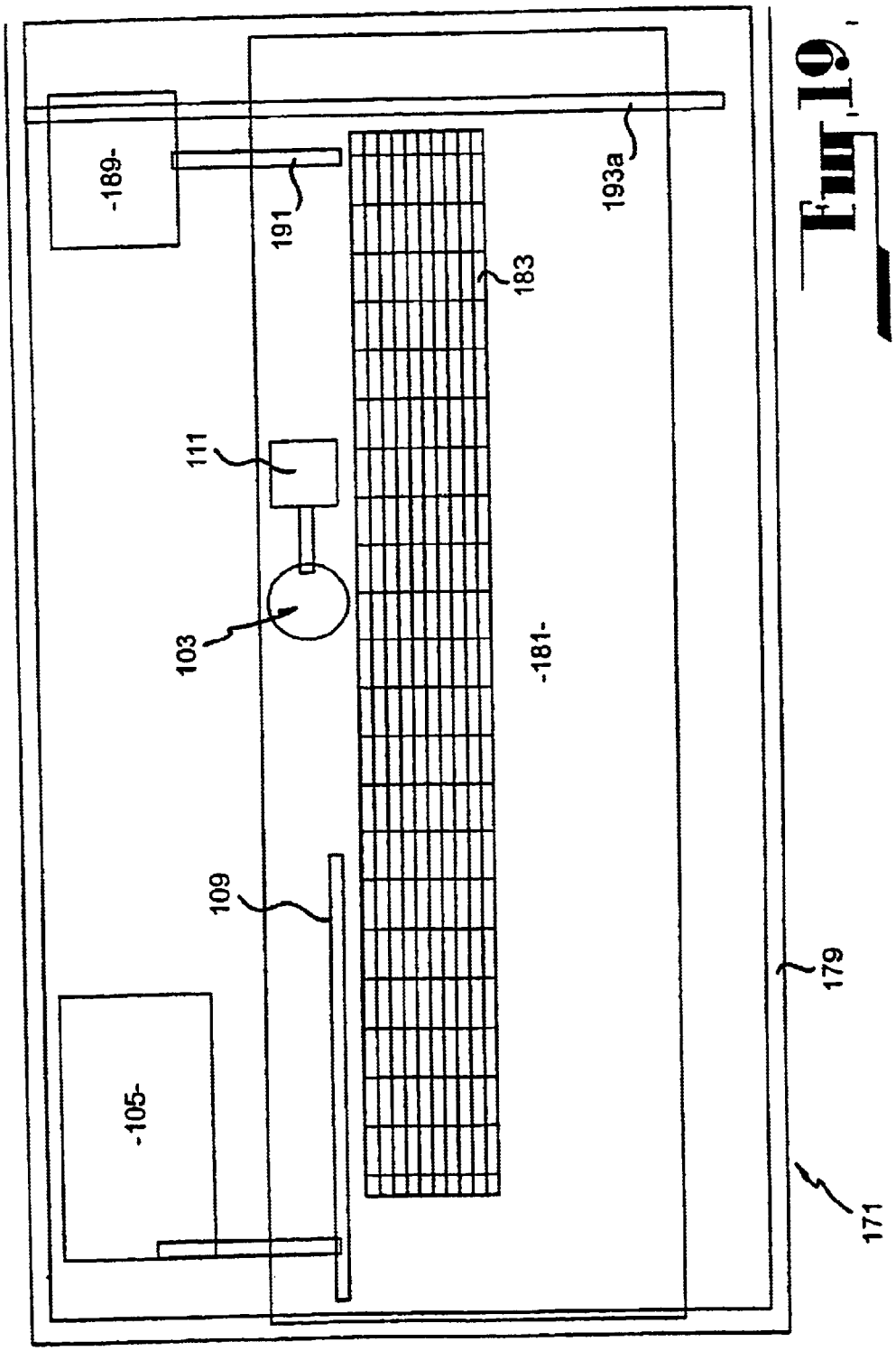
FIG. 19 is a cross sectional plan view of the tank system as viewed from beneath the holding tanks.
Figure 20:
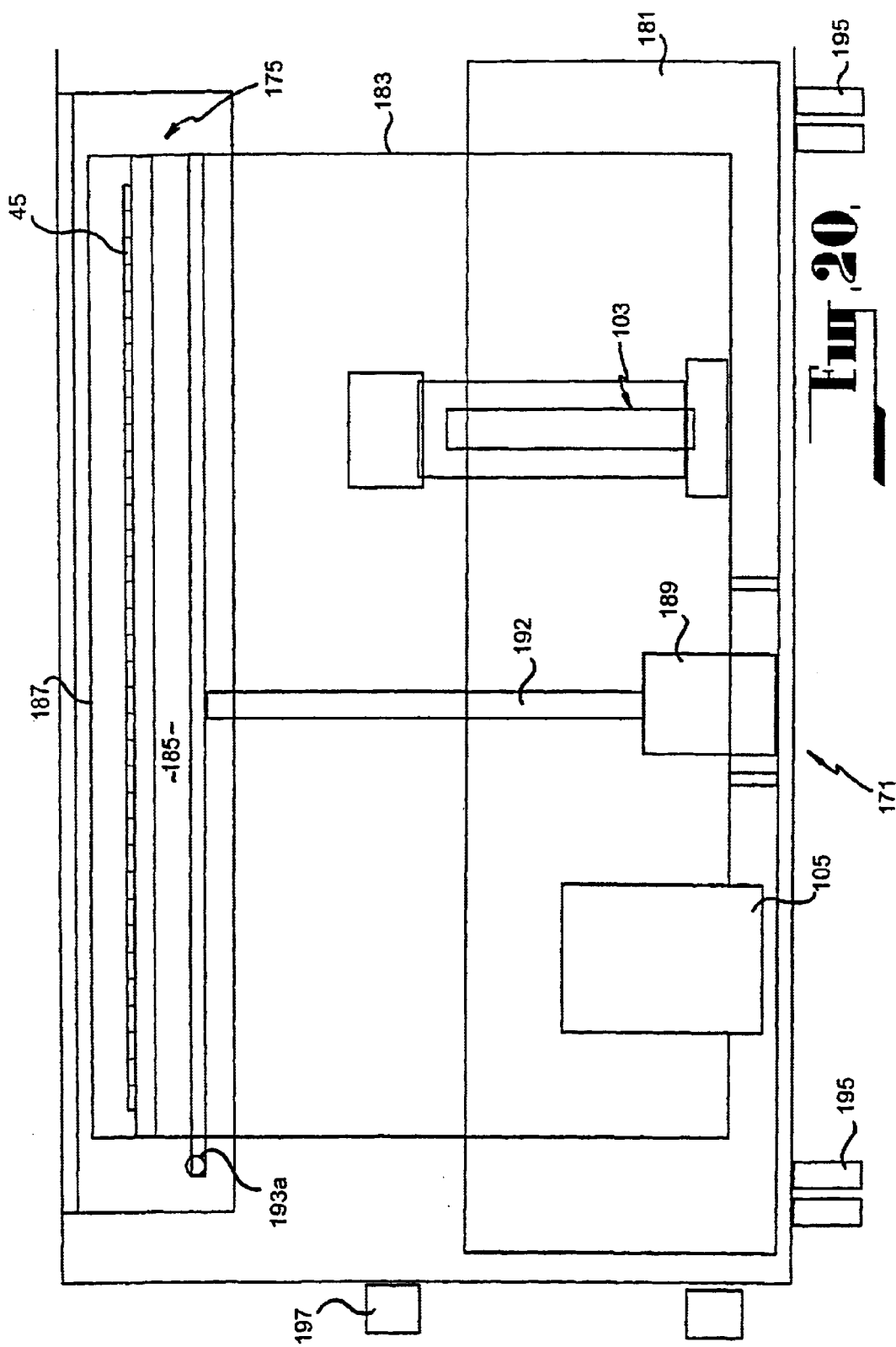
FIG. 20 is a side elevation of FIGS. 18 and 19.
Figure 21:
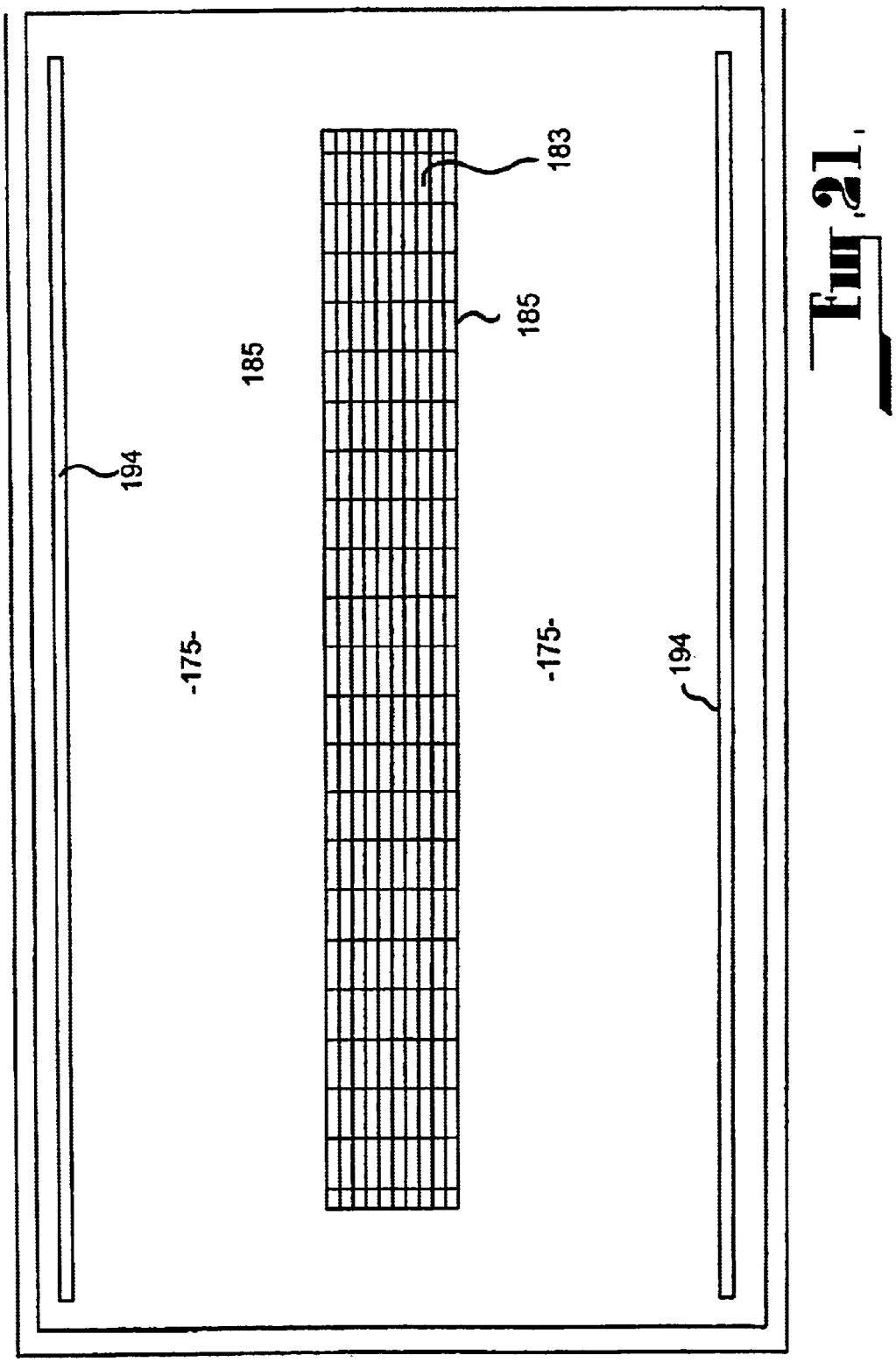
FIG. 21 is a similar view as to FIG. 19 but viewing the holding tanks from the top.

The protein skimmer 157 and associated protein circuit comprising protein pump 159, water inlet pipe 161 and water outlet pipe 163 are also connected into the tank system as shown in FIG. 19. In this embodiment, the protein skimmer 157 and protein pump 159 are disposed adjacent to the end of the holding tank 125.

The third embodiment is another variation of each of the preceding embodiments, but essentially works on the same principle as the tank system described in the second embodiments.

The tank system 171 of the third embodiment, as shown in FIGS. 18 to 21, essentially comprises a main tank 173 which is divided into two longitudinally extending holding tanks 175, disposed at either side of a central filtering area 177.

The main tank 173 is actually disposed upon a lower cabinet 179 within which a large buffer tank 181 is disposed together with the remaining operating components of the tank system.

The filtering area 177 includes a large longitudinal biofilter 183 which projects down past the holding tanks 175 to repose in the large buffer tank 181.

The recirculating means includes a main pump 189 having connected thereto a pump inlet 191 which in turn is connected to the large buffer tank 181. The outlet of the main pump 189 has a main pump outlet pipe 192 divided into two separate water supply lines 193a and 193b, which are in turn connected to corresponding water inlet lines 194 for inletting water into the holding tank 175.

With having dual holding tanks 175, essentially a pair of partitions 185 are provided to separate each holding tank 175 from the filtering area 177, and a pair of lips 187 are mounted at the top of the partitions to provide the corresponding knife edges for the discharge of water from either holding tank to the biofilter 183.

Having dual holding tanks not only increases the capacity of the tank system but allows for separate viewing of the holding tanks from either side of the main tank 173. Accordingly, the present embodiment provides for a tank system which has particular utility for display purposes in a shopping centre, for example, to optimise the aesthetic presentation of aquatic animals to potential customers. Thus, in the present embodiment, the cabinet 179 is provided with castors 195 to improve the portability of the tank system, allowing it to be wheeled around to a desired location for display purposes. In addition, it is provided with buffers 197 so as to avoid damage to the cabinet from shoppers.

The fourth embodiment of the invention is generally similar to the first embodiment, adopting the same principle of operation, however it is directed towards a plurality of holding tank modules disposed in a sequential and longitudinally contiguous relationship with each other.

Figure 22:
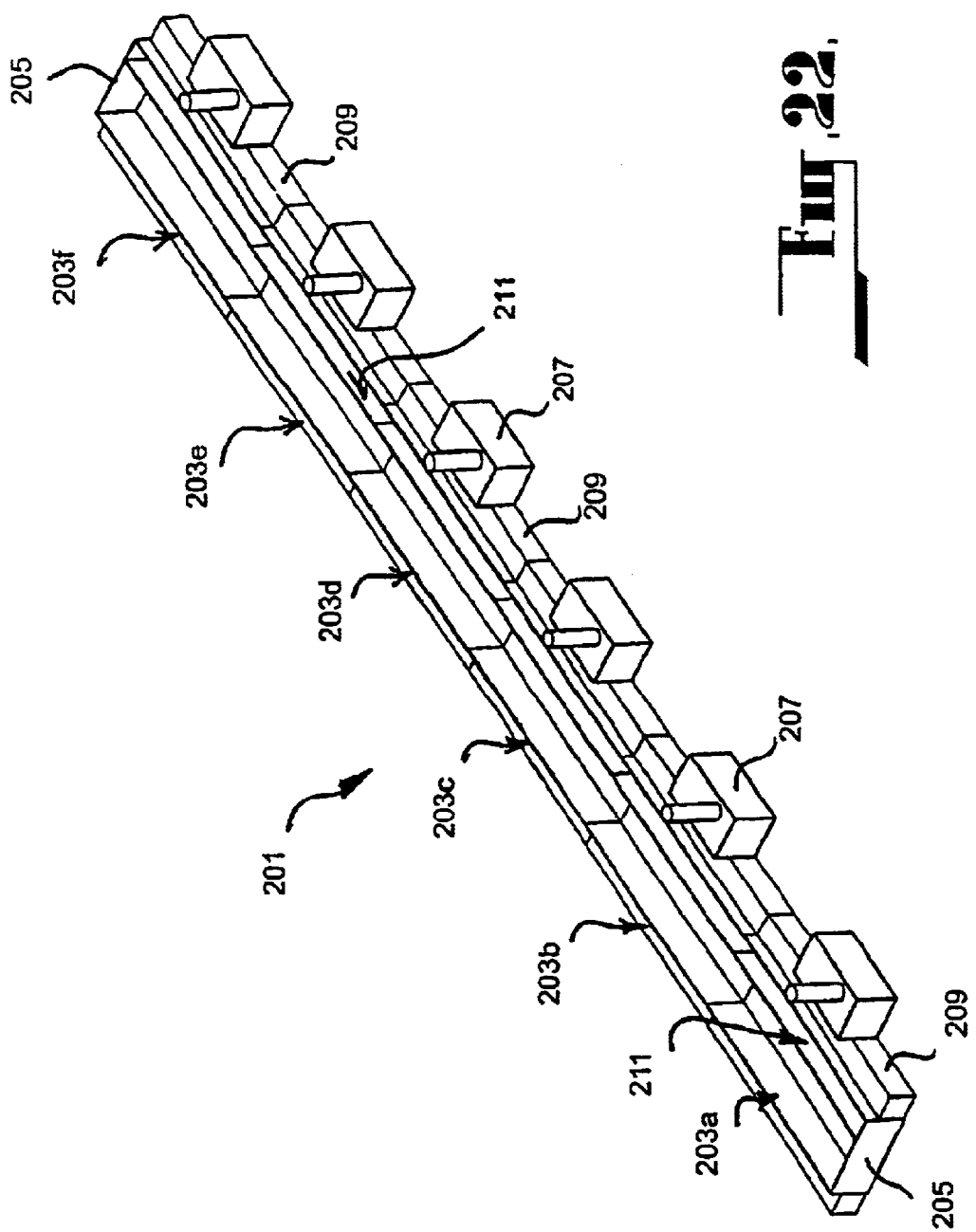
FIG. 22 is an isometric view of a rectilinear tank system in accordance with a fourth embodiment.
Figure 23:
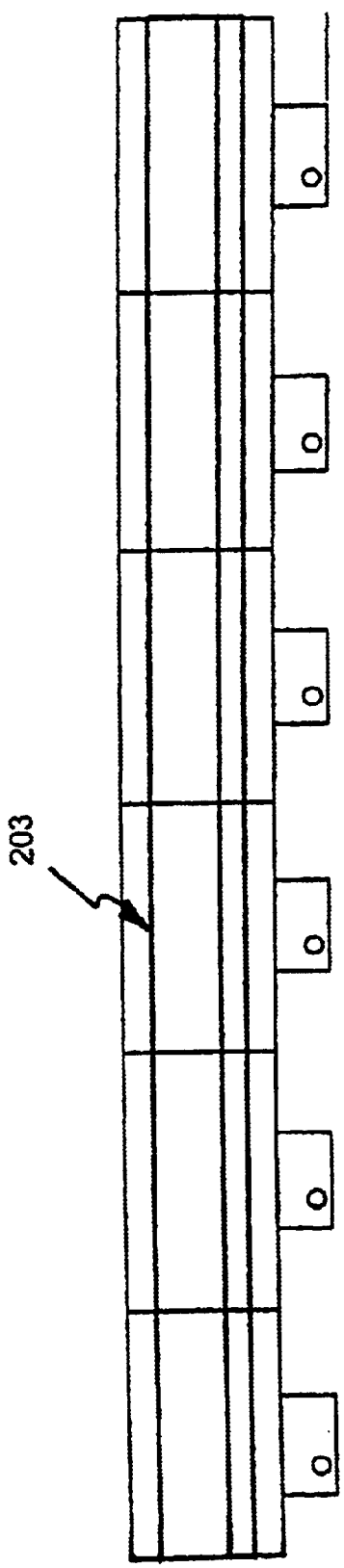
FIG. 23 is a plan view of FIG. 22.
Figure 24:
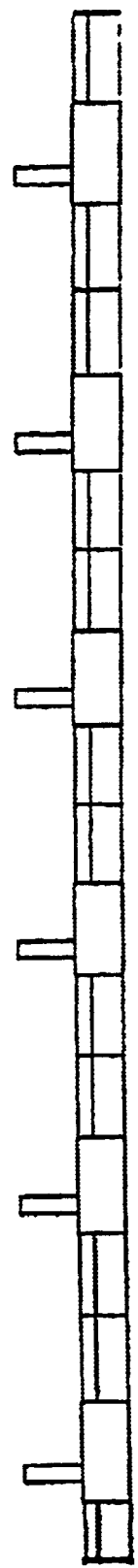
FIG. 24 is a side elevation of FIGS. 22 and 23.

As shown in FIGS. 22 to 24, the tank system 201 comprises a plurality of holding tank modules 203a, 203b . . . 203f.

Each holding tank module 203 is substantially similar to a tank system of the first embodiment except that one or more of its end walls are omitted so as to define a continuous passage 205 extending along the holding tank modules. Accordingly, the end modules 203a and 203f each have one end wall omitted therefrom and are interconnected with adjacent holding tank modules 203b and 203e respectively, both of which have both end walls omitted therefrom.

In this manner, fluid in one holding tank module can flow without restriction to an adjacent holding tank module and vice versa.

In order to accommodate this rectilinear arrangement of holding tanks, the services compartment 207, which in the first embodiment was located at the services end of a holding tank, is now disposed adjacent the side of a buffer tank 209 of each holding tank module. In the present embodiment, this buffer tank 209 is the one located adjacent the filtering area 211.

In order to provide for the creation of eddy currents as a result of aggregation of fluid within the holding tanks, the tank inlet means (not shown) within adjacent tank modules is alternately arranged so that the latent axial flow of fluid in one holding tank module is opposingly directed relative to the latent axial flow of fluid in an adjacent holding tank module. In this manner, latent axial flows oppose each other as arises when reflecting off a wall, similarly generating transversely and vertically directed eddy currents at actually spaced apart locations along the fluid surface of each holding tank module. Consequently, the resultant cross-flow of fluid focuses suspended solids carried thereby to the top of respective holding tanks, adjacent to the filtering area between successive eddy currents to facilitate flow across the tank discharge means and into the prefilter.

The rectilinear arrangement of holding tanks is particularly useful with certain species of fish that are required to accelerate quickly as part of their normal swimming habit, as opposed to reposing in a transverse position within the cross-flow. "This darting" trait is a particular characteristic of tuna, which is a fish of high commercial value.

The fifth embodiment is substantially similar to the fourth embodiment, except that the tank modules are arranged in a regular annular configuration, as opposed to a rectilinear arrangement.

Figure 25:
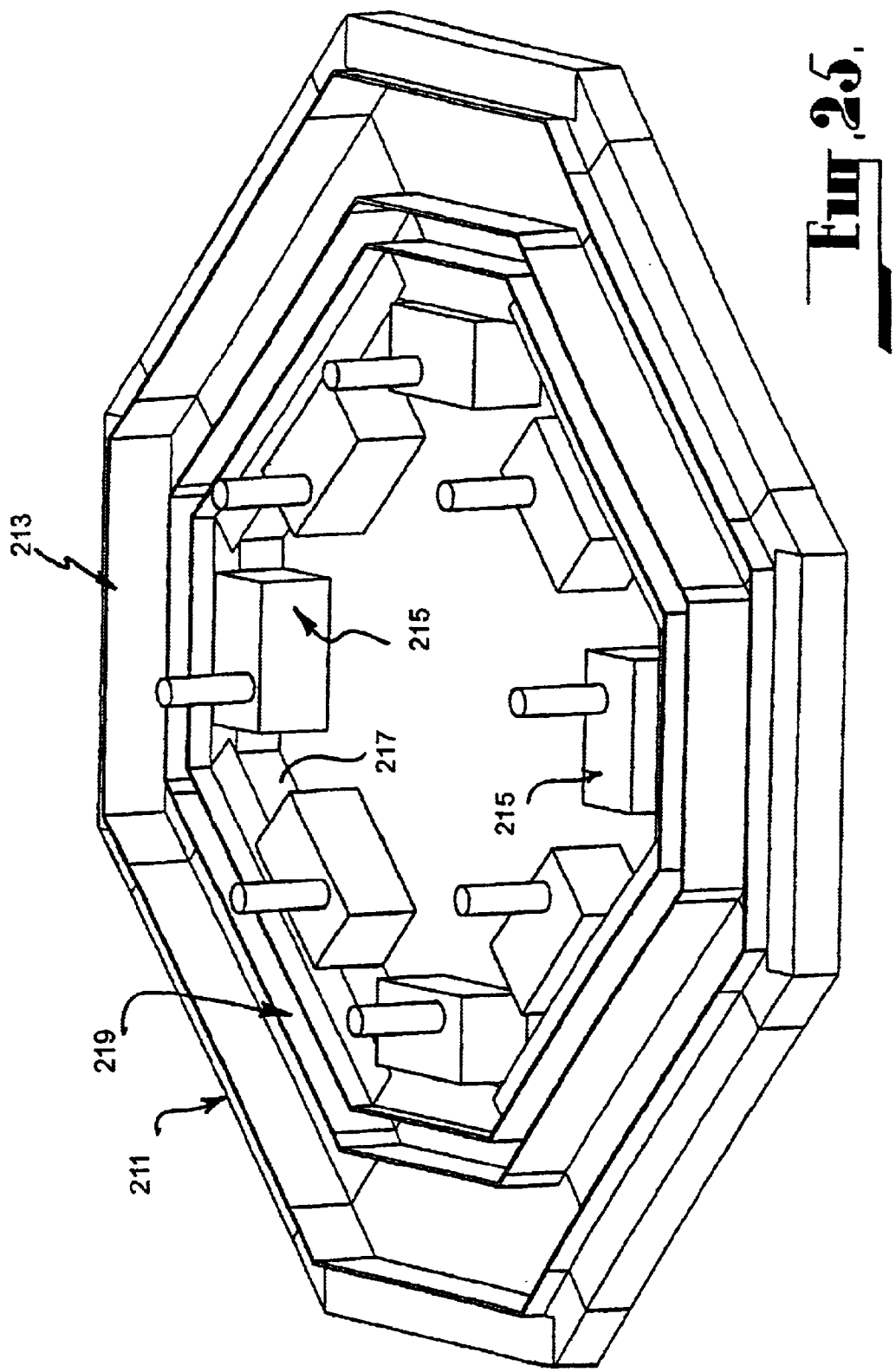
FIG. 25 is a perspective view of a regular annular tank system in accordance with a fifth embodiment.
Figure 26:
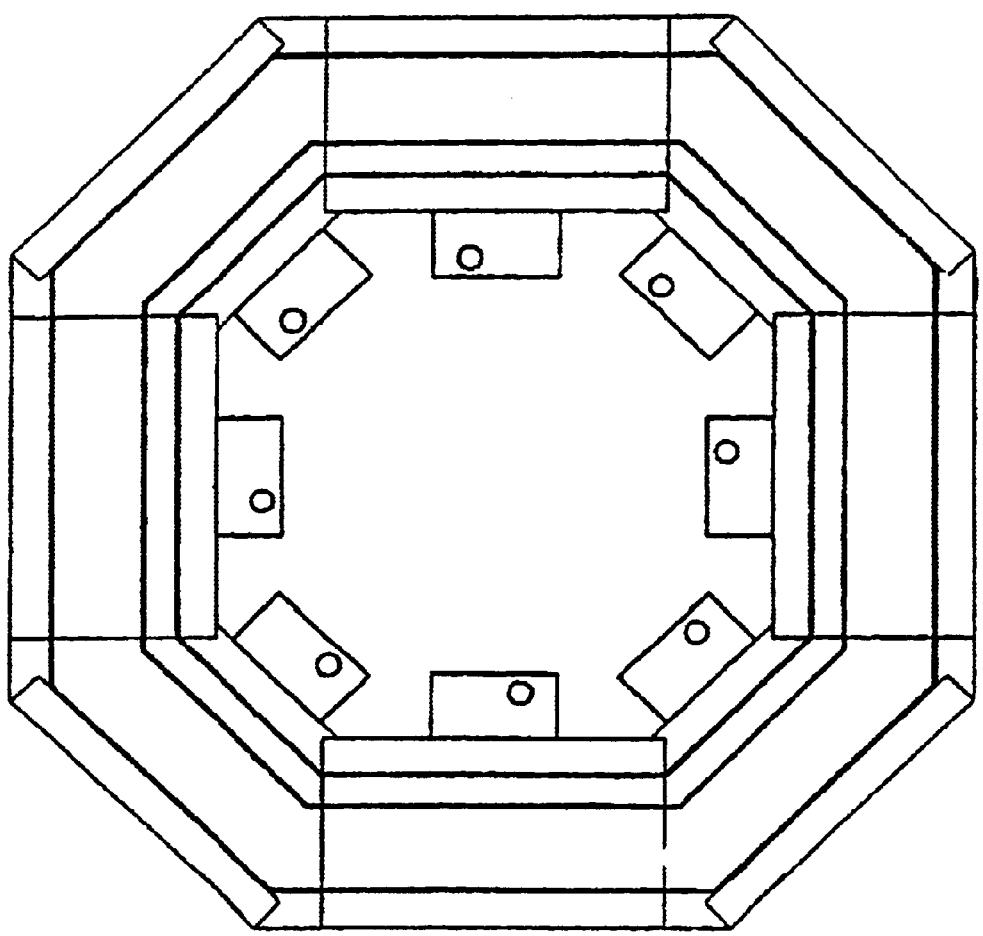
FIG. 26 is a plan view of FIG. 25.

As shown in FIGS. 25 and 26, the tank modules are particularly designed to include straight holding tank modules 221 and angular holding tank modules 223 in an alternating configuration so as to define a regular annular configuration. As shown, none of the holding tanks have end walls and are interconnected to provide for a continuous passage of fluid in an endless loop, longitudinally of the holding tank modules around the annual configuration.

As in the previous embodiment, the service compartments 215 are disposed adjacent the buffer tanks 217 along side the filtering area 219. In the present embodiment, this is on the inner side of the annular arrangement to facilitate servicing and control. A bridge (not shown) can be incorporated to provide access to the inside of the annulus.

Figure 27:
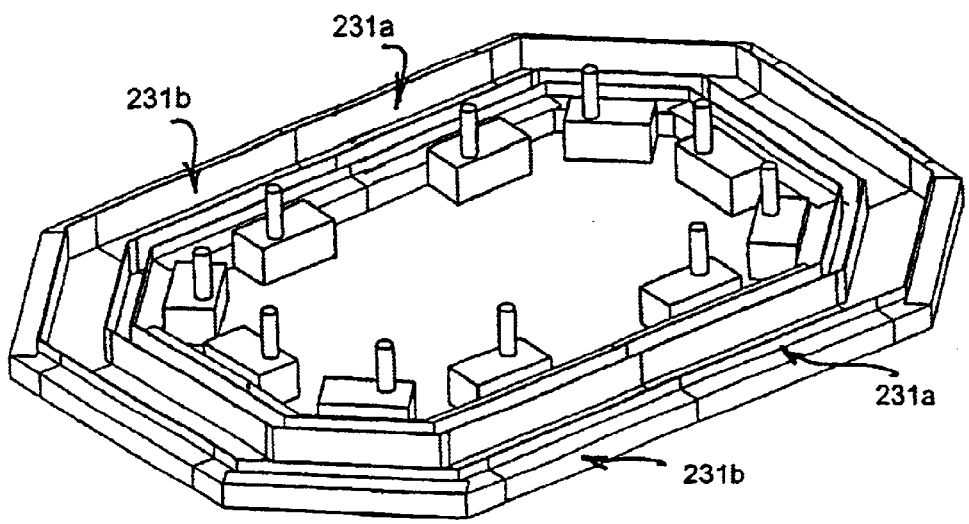
FIG. 27 is a perspective view of an elongated annular tank system in accordance with a sixth embodiment.
Figure 28:
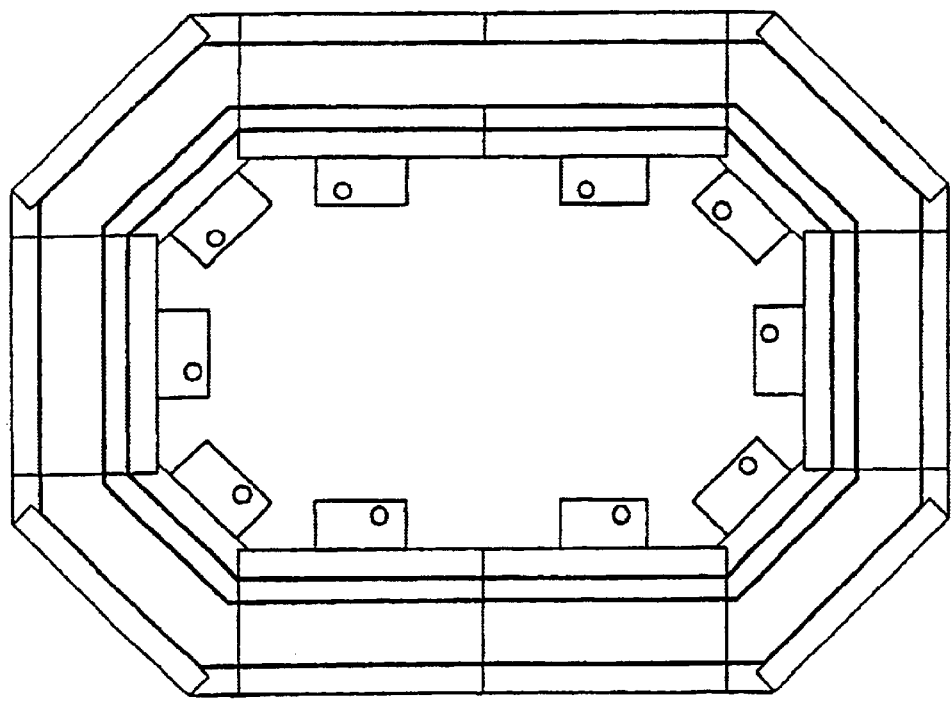
FIG. 28 is a plan view of FIG. 27.
Figure 29:
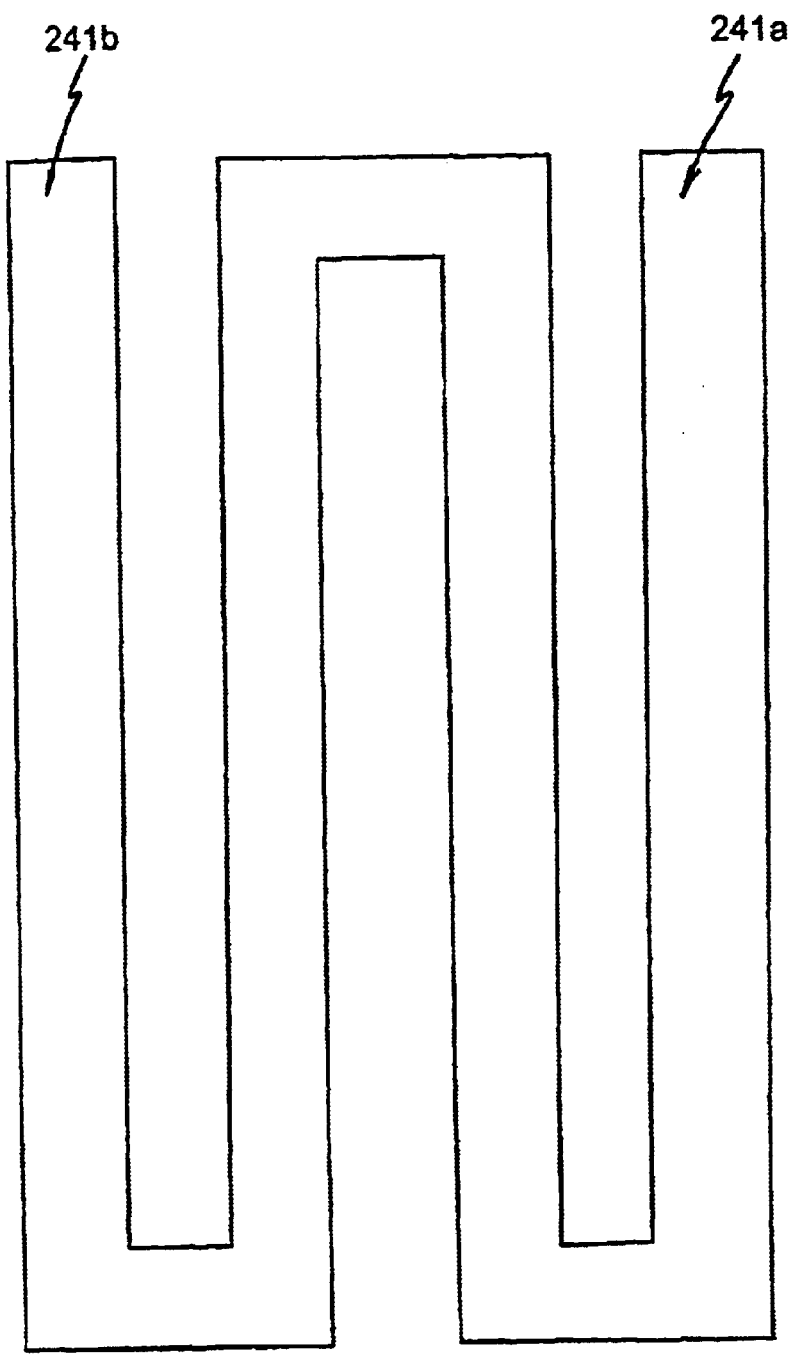
FIG. 29 is a plan view of a zig-zag rectilinear tank system in accordance with a seventh embodiment.

The sixth embodiment is shown in FIGS. 27 and 28 and is directed towards a minor variation on the fifth embodiment. Moreover, the sixth embodiment is directed towards an elongated annular configuration of holding tank modules, whereby a pair of straight section modules 231a and 231b are disposed adjacent each other at opposite sides of the annulus to define an elongated configuration.

The seventh embodiment is a variation of the fourth embodiment, whereby the rectilinear holding tank module configuration is extended with transverse end modules to define a zig-zagging configuration which similarly provides a continuous passage of fluid from one end holding tank module 241a to an opposing end holding tank module 241b, and vice versa.

Figure 30:
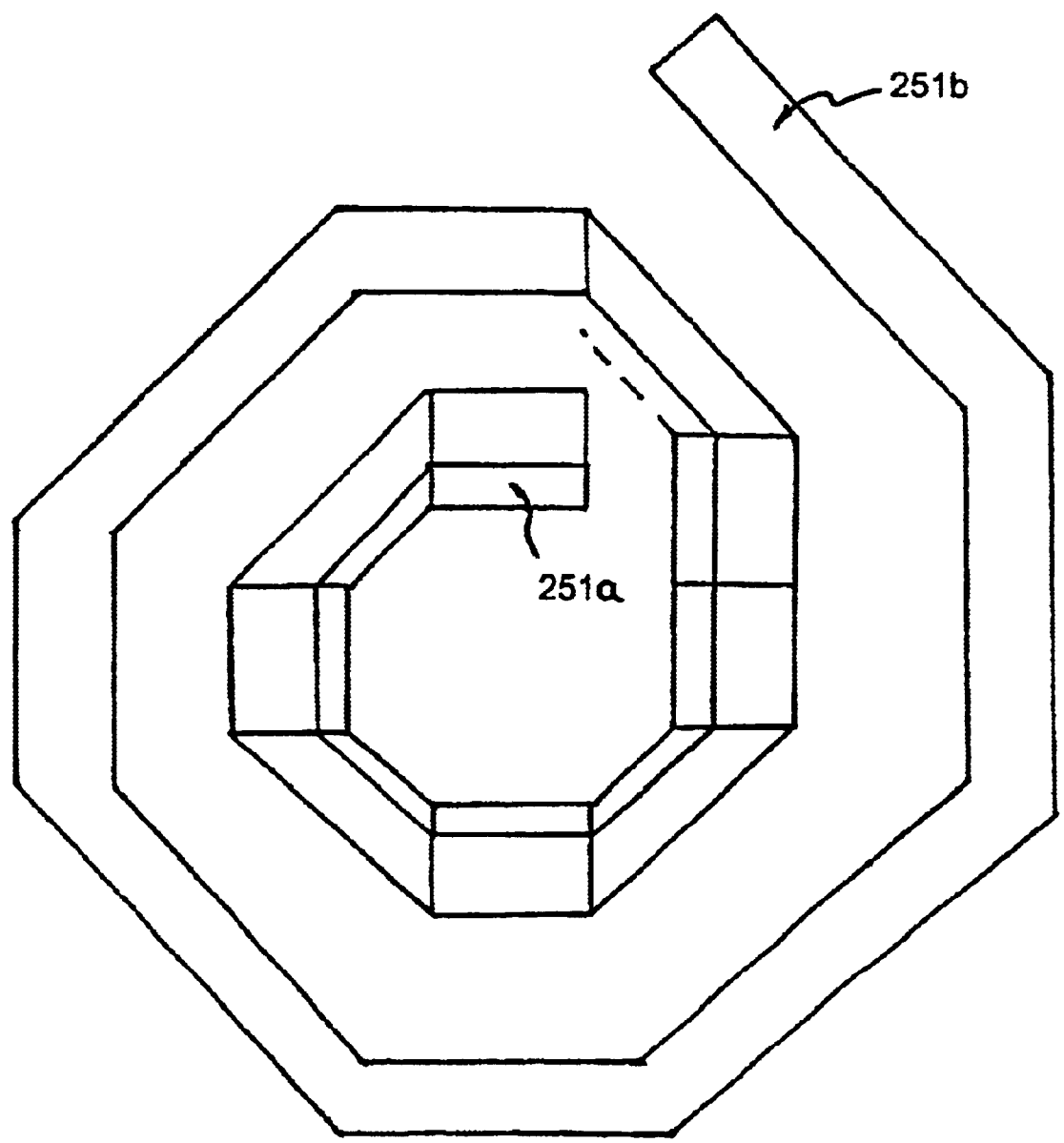
FIG. 30 is a plan view of a convoluted tank system in accordance with an eighth embodiment.

The eighth embodiment is a variation on the same theme as the preceding four embodiments, being alternatively directed towards a convoluted configuration which similarly provides for a continuous passage of fluid from one end holding tank module 251a, via the convoluted configuration, to an opposing end holding tank module 251b, and vice versa, as shown in FIG. 30 of the drawings.

It should be appreciated that the various embodiments provide a number of new features compared with prior art tank systems. These features are summarised below:

1. There is a uniform cross flow of water in the holding tanks, avoiding the creation of dead spots and thus a non uniform environment for aquatic product disposed within the holding tanks.
2. The biofilter is an integral part of the main tank and its particular arrangement allows for easier maintenance.
3. The buffer tanks double as extra water holding areas, and as shown in the first embodiment, as walkways between tanks systems in a multiple tank system environment.
4. The system normally operates with one main pump as part of the recirculating means for recirculating water throughout the tank system. However, the supplementary pump in the protein circuit can come on line when the water filtering requirement is maximal with heavy aquatic product loads to supplement the action of the biofilter or when the emptying of the tank is required.
5. The biofilter can be oxygen fed for peak loads and provide air stripping of ammonia, if desired by injecting oxygen into the filtering area.
6. The entire system can be monitored via a computer from remote locations.
7. The internal conditions of the tank can be also controlled by means of the computer, from remote locations.

It should also be appreciated that the scope of the present invention is not limited to the specific features of the embodiments described herein. Accordingly, the present invention can be embodied in a number of different ways, each embodiment incorporating modifications and variations in accordance with common general knowledge and known engineering principles which should not be construed to depart from the spirit nor scope of the invention.

The claims defining the invention are as follows:

1. A tank system for accommodating aquatic life comprising:

a holding tank for holding fluid to sustain aquatic life disposed therein;

a filtering means for receiving extraneous fluid from said holding tank at one end of a filtering area and allowing the fluid to gravitate through a filtering medium disposed within said filtering area to another end of the filtering area;

tank discharge means to provide for the discharge and passage of the extraneous fluid from the top of said holding tank, along the substantial longitudinal extent of one side thereof, to the top of said filtering area at said one end thereof; and recirculating means for recirculating the extraneous fluid passed through said filtering means, from the other end of said filtering area to said holding tank, the recirculating means including tank inlet means for inletting fluid under pressure from said filtering means into said holding tank; and said filtering means being disposed adjacent to said holding tank and said tank discharge means allowing for the natural flow of fluid from the top of said holding tank adjacent to said one side, to the top of said filtering area;

wherein said tank inlet means is disposed at the base of said holding tank, spaced from, and extending generally parallel, to said tank discharge means to provide for a uniform, circulatory cross-flow of fluid about a generally horizontal axis in substantially parallel relationship to said one side and to said tank inlet means, along the longitudinal extent of said holding tank and said tank discharge means.

2. A tank system as claimed in claim 1, wherein said tank inlet means comprises a fluid inlet line having a series of inletting nozzles disposed to inject fluid in a direction to promote said circulatory cross-flow of fluid, said inletting nozzles of said fluid inlet line being disposed to inject fluid at an oblique angle relative to the horizontal and vertical, upwardly and transversely across said holding tank; whereby said fluid inlet line is either disposed: (i) proximate to said filtering means directly below said tank discharge; or (ii) distally from said filtering means, diagonally opposite to said tank discharge means; or whereby a pair of fluid inlet lines are provided both having a series of inletting nozzles disposed to inject fluid at an oblique angle relative to the horizontal and vertical, upwardly and transversely across said holding tank in complementary directions to promote said circulatory cross-flow of fluid, but where one said fluid inlet line is disposed proximate to said filtering means directly below said tank discharge means, and the other said fluid inlet line is disposed distally from said filtering means, diagonally opposite to said tank discharge means.

3. A tank system as claimed in claim 2, wherein said inletting nozzles of said fluid inlet line directly below said tank discharge means direct fluid with more of a horizontal component than said inletting nozzles of said fluid inlet line diagonally opposite to said tank discharge means.

4. A tank system as claimed in claim 2, wherein said pair of inlet lines are selectively operated either together or individually, or with a particular duty cycle where said one inlet line injects fluid into said holding tank continuously and said other inlet line injects fluid into said holding tank periodically.

5. A tank system as claimed in claim 1, wherein said tank inlet means has a rectilinear arrangement of inletting nozzles for jetting fluid into said holding tank extending longitudinally thereof, whereby said rectilinear arrangement of inletting nozzles is disposed to be marginally offset from true parallel relationship with said horizontal axis to generate a latent axial flow of fluid relative to said horizontal axis within said holding tank, directing said cross-flow spirally about the central longitudinal axis of the holding tank.

6. A tank system as claimed in claim 5, wherein one end of said tank inlet means is marginally elevated relative to the other end within said holding tank to achieve the marginal offset from true parallel relationship with said horizontal axis.

7. A tank system as claimed in claim 5, wherein said holding tank is provided with opposing end walls, one at each end of said tank inlet means, said walls providing a surface to reflect the latent axial flow of fluid along said holding tank, thereby generating transversely and vertically directed eddy currents at axially spaced apart locations along the surface of said holding tank to focus cross-flow of fluid carrying suspended solids to the top of said holding tank and towards said one side, between successive eddy currents.

8. A tank system as claimed in claims 5, wherein a plurality of holding tank modules are disposed in sequential and longitudinally contiguous relationship with each other to define a continuous passage between the holding tank modules, whereby fluid in one holding tank module can flow without restriction to an adjacent holding tank module, and vice versa, and wherein said tank inlet means within adjacent holding tank modules is alternately arranged so that said latent axial flow of fluid in one said holding tank module is opposingly directed relative to said latent axial flow of fluid in an adjacent said holding tank module, thereby generating transversely and vertically directed eddy currents at axially spaced apart locations along the surface of each said holding tank module to focus cross-flow of fluid carrying suspended solids to the top of respective said holding tanks and towards said one side thereof between successive eddy currents.

9. A tank system as claimed in claim 8, wherein said holding tank modules are arranged in an annular configuration to provide for a continuous passage of fluid in an endless loop longitudinally of said holding tank modules.

10. A tank system as claimed in claim 8, wherein said holding tank modules are arranged in a zigzagging configuration to provide for a continuous passage of fluid from one end holding tank module via said zig-zagging configuration, to an opposing end holding tank module, and vice versa.

11. A tank system as claimed in claim 8, wherein said holding tank modules are arranged in a convoluted configuration to provide for a continuous passage of fluid from one end holding tank module via said convoluted configuration, to an opposing end holding tank module, and vice versa.

12. A tank system as claimed in claim 1, wherein the tank discharge means includes a partition to maintain separation of the contents of said holding tank and the filtering means, and a primary lip at the top of said partition, whereby extraneous fluid from said holding tank is permitted to cascade over the primary lip and subsequently pass down through said filtering means; and wherein the filtering means includes a prefilter disposed adjacent to said primary lip for extracting solids from the fluid on it cascading over the primary lip prior to passing through to said filtering means, said prefilter including:

(i) a chamber for receiving and expelling liquid from the cascading flow of liquid having an anterior wall surmounted by said primary lip, a posterior wall spaced therefrom surmounted by a secondary lip and a bottom; and (ii) a suction pipe disposed longitudinally within said chamber in parallel spaced relationship to said walls having a series of inlet holes to extract some of the liquid with entrained solids therein from said chamber.

13. A tank system as claimed in claim 12, wherein the prefilter includes a flow diverting means to divert and reverse the flow of fluid from the cascading flow over said primary lip so that a reversing and opposing fluid flow is created adjacent the cascading flow from said primary lip and upwardly along the posterior wall of said chamber, the relative height of said secondary lip being less than the height of said primary lip so as to facilitate subsequent cascading of the reversing fluid flow over the secondary lip and into the one end of said filtering means.

14. A tank system as claimed in claim 13, wherein the outer surface of said suction pipe functions as said flow diverting means, being spaced from the walls and bottom of said chamber to define a passageway for the convoluted flow of fluid around the suction pipe to create said reversing and opposing fluid flow.

15. A tank system as claimed in claim 12, wherein said series of holes are disposed on the surface of said suction pipe at a position to confront said cascading flow to facilitate extracting solids retained therein.

16. A tank system as claimed in claim 12, wherein said prefilter forms part of a solids extracting means comprising:
  a foam fractionator having a main fractionation column for treating and fractioning fluid injected therein, a foam collecting chamber surmounting said column, and a passageway interconnecting the two so that foam generated within said main fractionation column may be expelled into said foam collecting chamber;
  a fluid branching circuit connected to said suction pipe for receiving fluid containing suspended solids from said chamber and delivering same to said main fractionation column at different levels;
  pumping means connected into said fluid branching circuit to provide negative pressure to and extract some of the solids entrained liquid from said prefilter via said suction pipe and inject the same under positive pressure into said main fractionation column;
  aerating means to aerate and treat fluid injected into said main fractionation column with oxygen or ozone, or a combination of these;
  fluid outlet means to outlet treated fluid from said main fractionation column;
  foam outlet means to outlet collected foam from said foam collecting chamber; and
  return means to return treated fluid from said fluid outlet to said holding tank.

17. A tank system as claimed in claim 16, wherein said branching circuit includes valve means to regulate the flow of fluid in a branch delivering fluid to one level of said main fractionation column relative to another branch delivering fluid to another level of said main fractionation column.

18. A tank system as claimed in claim 16, wherein said fluid outlet means has venting means connected thereto via control valve means to selectively vent gases accumulated within said fluid outlet means to the atmosphere.

19. A tank system as claimed in claim 16, wherein said return means includes a discharge chamber wherein treated fluid from said fractionation column is discharged from said fluid outlet to allow the treated fluid to degas before being returned to said holding tank.

20. A tank system as claimed in claim 19, wherein said discharge chamber is disposed adjacent one end of said holding tank and includes a discharge port to discharge fluid from said discharge chamber into said holding tank, said discharge port being disposed towards the top of said discharge chamber and overlying an adjacent wall of said holding tank to allow for the discharged fluid to cascade over said adjacent wall and into said holding tank for further degassing.

21. A tank system as claimed in claim 19, including a fluid cooling means having a cooling coil disposed in said discharge chamber to selectively cool said fluid to a prescribed temperature prior to discharging into said holding tank.

22. A system as claimed in claim 21, wherein said fluid cooling means is connected to a controller having a sensing probe for measuring the temperature of fluid within said holding tank and wherein said fluid cooling means is controlled by said controller to adjust said prescribed temperature to maintain or reduce, if necessary, the temperature of fluid within said holding tank.

23. A tank system as claimed in claim 22, wherein said controller also has sensing probes for measuring ORP, pH, salinity or the amount of fluid within said holding tank, or any combination of these, and a chemical dispenser is provided to maintain optimum pH and salinity levels in accordance with a control program run by said controller.

24. A tank system as claimed in claim 23, wherein said recirculating means has a fresh fluid inlet means and a fluid drain means each having stop valve means associated therewith for respectively inletting fresh fluid into the tank system and draining fluid therefrom, said stop valve means being connected to said controller for control thereby to automatically introduce fluid into the system and/or drain fluid therefrom in accordance with the monitoring of the fluid level or salinity thereof, or both, to maintain the amount of fluid or salinity thereof at a prescribed level.

25. A tank system as claimed in claim 22, wherein said controller includes a modem and telecommunication link to allow for remote connection to, and monitoring and control of said tank system.

26. A tank system as claimed in claim 2, wherein said filtering means is surmounted at said one end thereof by an upper drip tray that is V-shaped in cross-section to accommodate a liquid permeable filtering mat, said upper drip tray being provided with holes to allow extraneous liquid from said holding tank passing through said mat to gravitate through said upper drip tray and to said filtering medium, said upper drip tray being provided with a series of recesses along one side thereof to vent gases from within the filtering area.

27. A tank system as claimed in claim 26, wherein the posterior side of said secondary lip surmounts the anterior side of said upper drip tray, so that extraneous liquid from within said chamber may cascade over said secondary lip and into said upper drip tray; and the posterior side of said upper drip tray is formed with a series of posterior flaps to facilitate mounting the upper drip tray to the posterior wall of said filtering means, whereby said recesses are disposed between said flaps.

28. A tank system as claimed in claim 26, wherein said filtering means includes a lower planar drip tray disposed beneath said upper drip tray having one or more layers individually accommodating permeable membranes for receiving and further filtering liquid gravitating through said upper drip tray, said lower drip tray being disposed to maintain a gap between the longitudinal edge thereof and the adjacent wall of said filtering means to facilitate the venting of gases from said filtering area.

29. A tank system as claimed in claim 28, wherein said recesses and said gap are vertically aligned to facilitate venting of gases from said filtering means.

30. A tank system as claimed in claim 1, wherein said filtering means is a biofilter and said filtering medium comprises a biomass capable of being permeated by gas and said extraneous fluid, said filtering means including an air outlet pipe disposed towards said other end of said filtering means and extending longitudinally therethrough, said outlet pipe having a series of nozzles obliquely disposed relative to the vertical and horizontal so as to inject air or oxygen into the biofilter transversely across the filtering area to strip gases produced by the biomass, said nozzles be angled to reflect the injected gas off a via the top of said filtering area.

31. A tank system as claimed in claim 1, wherein said filtering means is a biofilter and said filtering medium comprises a biomass comprising bioballs housed within discrete elements having an external casing permeated with holes to allow said extraneous fluid to enter and gravitate down through said element, said bioballs being bounded within said casing between a pair of spaced apart layers of permeable material respectively disposed at the top and bottom of said casing, and clipping means provided along one side of the casing to allow clipping into position with the filtering area and discrete removal of said elements for maintenance purposes.

32. A tank system as claimed in claim 30, wherein said filtering means includes a secondary outlet/inlet pipe within said filtering area to selectively be connected to function as a second air outlet pipe for cleaning the biofilter in conjunction with said air outlet pipe, or be connected into the recirculating system to bypass the recirculating of fluid from said other end of the filtering means to said holding tank and instead recirculate the fluid back into the filtering means directly to keep the bacteria in the biofilter alive in a shutdown or transport mode.

33. A tank system as claimed in claim 1, including a buffer tank communicating with said filtering means and being connected to said recirculating means separately of said filtering means to supply fluid for inletting into said holding tank separately of said filtering means, thereby providing a separate and parallel flow of fluid to the flow of fluid through said filtering means, said buffer tank having sufficient headroom to receive and accommodate a sudden oversupply of fluid from said holding tank into said filtering means whilst still maintaining a fluid level within said filtering area, said buffer tank being of a height less than the height of the filtering area to prevent a backflow o& fluid beyond a prescribed threshold level.

34. A tank system as claimed in claim 33, wherein said buffer tank is disposed adjacent to said holding tank or to said filtering means in substantial horizontal alignment therewith and is provided with a lid to form an elevated platform for walking along and accessing the contents of said holding tank or said filtering means.

35. A tank system as claimed in claim 33, wherein said buffer tank is partitioned into discrete compartments in serial fluid communication to graduate the flow of fluid therethrough and provide the opportunity for additional filtering, pH levelling, filtering means fluid level gauging, or fluid introduction into the system, or any combination of these.

36. A tank system as claimed in claim 33, wherein a pair of buffer tanks are disposed, one at either side of said holding tank, and both connect to said filtering means proximate to the bottom thereof.

37. A tank system as claimed in claim 33, wherein the tank system is of modular form, said holding tank, said filtering means, said tank discharge means and said recirculating means forming components of a main tank module and said buffer tank(s) forming a separate module(s), whereby said main tank module and said buffer tank module(s) are interconnected by quick release couplings to facilitate rapid assembly and disassembly for transport purposes.

38. A tank system for accommodating aquatic life comprising:
   a holding tank for holding fluid to sustain aquatic life disposed therein;
   a filtering means for receiving extraneous fluid from said holding tank at one end of a filtering area and allowing the fluid to pass through a filtering medium disposed within the filtering area to another end of the filtering area;
   tank discharge means to provide for the discharge and passage of the extraneous fluid from said holding tank to the top of said filtering means;
   recirculating means for recirculating the extraneous fluid passed through said filtering means, from proximate the bottom of said filtering means to said holding tank;
   one side of said filtering means being adjacent to said holding tank and said tank discharge means allowing for the natural flow of fluid from the top of said holding tank adjacent to said one side, to the top of said filtering area; and
   a buffer tank being adapted to communicate with said filtering means to provide for a common supply of fluid therebetween;
   wherein said buffer tank is connected to said recirculating means separately of said filtering means to supply fluid for inletting into said holding tank separately of said filtering means, thereby providing a separate and parallel flow of fluid to the flow of fluid through said filtering means, said buffer tank having sufficient headroom to receive and accommodate a sudden oversupply of fluid from said holding tank into said filtering means whilst still maintaining a fluid level within said filtering area, said buffer tank being of a height less than the height of the filtering area to prevent a backflow of fluid beyond a prescribed threshold level.

39. A tank system as claimed in claim 38, wherein said buffer tank is disposed adjacent to said holding tank or to said filtering means in substantial horizontal alignment therewith and is provided with a lid to form an elevated platform for walking along and accessing the contents of said holding tank or said filtering means.

40. A tank system as claimed in claim 38, wherein said buffer tank is partitioned into discrete compartments in serial fluid communication to graduate the flow of fluid therethrough and provide the opportunity for additional filtering, pH levelling, filtering means fluid level gauging, or fluid introduction into the system, or any combination of these.

41. A tank system as claimed in claim 38, wherein a pair of buffer tanks are disposed, one at either side of said holding tank, and both connect to said filtering means proximate to the bottom thereof.

42. A tank system as claimed in claim 39, wherein the tank system is of modular form, said holding tank, said filtering means, said tank discharge means and said recirculating means forming components of a main tank module and said buffer tank(s) forming a separate module(s), whereby said main tank module and said buffer tank module(s) are interconnected by quick release couplings to facilitate rapid assembly and disassembly for transport purposes.

43. A method for accommodating aquatic life comprising:
   discharging fluid from the top and along the substantial longitudinal extent of one side of a holding tank filled with fluid in which aquatic life may be disposed;
   filtering out impurities from the discharged fluid whilst gravitating through a filtering area;
   recirculating filtered fluid to the bottom of the holding tank; and inletting the recirculated filtered fluid into the tank under pressure at a position spaced from and generally parallel to where the fluid is discharged from the holding tank, so that a uniform, circulatory cross-flow of fluid is created along the longitudinal exent of the holding tank about a generally horizontal axis in substantially parallel relationship to said one side.

44. A method as claimed in claim 43, including inletting recirculated fluid into the holding tank from directly below where fluid is discharged, at an oblique angle relative to the horizontal and vertical, upwardly and transversely across said holding tank in a direction to promote said circulatory cross-flow of fluid.

45. A method as claimed in claim 44, including inletting recirculated fluid into the holding tank from a diagonally opposed position to where fluid is discharged, at an oblique angle relative to the horizontal and vertical, upwardly and transversely across said holding tank, in a direction to promote said circulatory cross-flow of fluid.

46. A method as claimed in claim 45, including directing fluid with more of a horizontal component from the position below from where fluid is discharged than in the case of directing fluid from the diagonally opposed position to where the fluid is discharged.

47. A method as claimed in claim 46, wherein said inletting comprises injecting fluid from said positions either together or individually, or with a particular duty cycle whereby said injecting of fluid into said holding tank from directly below said discharging occurs continuously and said injecting of fluid into said holding tank from diagonally opposite to said discharging occurs periodically.

48. A method as claimed claim 43, including inletting said fluid rectilinearly and longitudinally of said holding tank, but marginally offset from true parallel relationship with said horizontal axis to generate a latent axial flow of fluid relative to said horizontal axis within said holding tank, directing said cross-flow spirally about said horizontal longitudinal axis of the holding tank.

49. A method as claimed in claim 48, including reflecting the latent axial flow of fluid along said holding tank, thereby generating transversely and vertically directed eddy currents at axially spaced apart locations along the surface of said holding tank to focus cross-flow of fluid carrying suspended solids to the top of said holding tank and towards said one side, between successive eddy currents.

50. A method as claimed in claim 43, wherein said discharging includes cascading said extraneous fluid into a chamber adjacent said holding tank, and expelling said extraneous fluid therefrom; and said filtering includes prefiltering said extraneous fluid from within said chamber to extract some of the liquid with entrained solids therein from said chamber prior to filtering the remainder of the extraneous fluid whilst gravitating through said filtering area.

51. A method as claimed in claim 50, including diverting and reversing the flow of fluid from the cascading flow from the holding tank, so that a reversing and opposing fluid flow is created adjacent said cascading flow, and subsequently cascading the reversing fluid flow from the chamber to gravitate through said filtering area.

52. A method as claimed in claim 50, including extracting some of the fluid from said chamber by sucking some of the extraneous fluid through a series of holes at a position confronting said cascading flow to facilitate extracting solids retained therein.

53. A method as claimed in claim 50, including receiving the extracted fluid with solids entrained therein from said chamber under negative pressure, branching it into separate flows and injecting it into a main fractionation column at different levels under positive pressure, treating and fractioning the injected fluid, expelling foam into a foam collecting chamber at the top of the main fractionation column and outletting the collected foam, aerating and treating the injected fluid with oxygen or ozone, or a combination of these, outletting the treated fluid from the main fractionation column, and returning the outlet fluid to the holding tank.

54. A method as claimed in claim 53, including regulating the flow of fluid injected into said main fractionation column at one level relative to the flow of liquid injected into said main fractionation column at the other level.

55. A method as claimed in claim 53, including venting gases accumulated during the outletting of treated fluid from the main fractionation column to the atmosphere.

56. A method as claimed in claim 53, including discharging the outlet fluid from the main fractionation column into a discharge chamber for degassing before returning the fluid to the holding tank.

57. A method as claimed in claim 56, wherein the returning includes cascading the discharged fluid into the holding tank for further degassing.

58. A method as claimed in claim 56, including selectively cooling the fluid in the discharge chamber to a prescribed temperature prior to returning it into the holding tank.

59. A method as claimed in claim 58, including measuring the temperature of fluid within said holding tank and controlling the cooling to adjust the prescribed temperature to maintain or reduce, if necessary, the temperature of fluid within said holding tank.

60. A method as claimed in claim 59, including measuring ORP, pH, salinity or the amount of fluid within the holding tank, or any combination of these, and dispensing chemical to maintain optimum pH and salinity levels.

61. A method as claimed in claim 60, including monitoring the fluid level or salinity thereof, or both, and automatically introducing fluid into the holding tank and/or draining fluid therefrom to maintain the amount of fluid or salinity thereof within the holding tank at a prescribed level.

62. A method as claimed in claim 59, wherein the monitoring and control of the fluid within the holding tank is performed remotely.

63. A method as claimed in claim 43, wherein said extraneous fluid gravitates through a biofilter containing a biomass in the filtering area, and the method includes injecting air or oxygen into the biofilter obliquely relative to the vertical and horizontal, transversely across the filtering area to strip gases produced by the biomass so that the injected gas is reflected off a side of the filtering area in an upward direction, and venting the gases ultimately via the top of the filtering area through gaps provided therein.

64. A method as claimed in claim 63, including bypassing the recirculating of fluid from the filtering area to the holding tank and instead recirculating the fluid back into the filtering area directly to keep the bacteria in the biofilter alive in a shutdown or transport mode.

65. A method as claimed in claim 43, including recirculating a separate and parallel flow of fluid after filtering from the filtering area to the holding tank via a buffer tank, and automatically channelling excessive fluid out during the filtering and recirculating steps into said buffer tank when a sudden oversupply of fluid is discharged from said holding tank for filtering, thereby maintaining a fluid level within the filtering area at a prescribed threshold level, and automatically feeding the excessive fluid back during the filtering and recirculating steps, as the excessive discharge volumes are diminished.

66. A method for accommodating aquatic life comprising:

discharging fluid from the top of a holding tank filled with fluid in which aquatic life may be disposed;

filtering out impurities from the discharged fluid whilst gravitating through a filtering area;

recirculating filtered fluid to the bottom of the holding tank;

recirculating a separate and parallel flow of fluid after filtering from the filtering area to the holding tank via a buffer tank;

automatically channelling excessive fluid out during the filtering and recirculating steps into said buffer tank when a sudden oversupply of fluid is discharged from said holding tank for filtering, thereby maintaining a fluid level within the filtering area at a prescribed threshold level; and automatically feeding the excessive fluid back during the filtering and recirculating steps, as the excessive discharge volumes are diminished.

* * * * *

UNITED STATES PATENT AND TRADEMARK OFFICE
CERTIFICATE OF CORRECTION

PATENT NO. : 6,641,732 B1 Page 1 of 1
DATED : November 4, 2003
INVENTOR(S) : Matthew Cheyne It is certified that error appears in the above-identified patent and that said Letters Patent is hereby corrected as shown below:

Column 20,
Line 16, "claims" should read -- claim --

Column 22,
Line 35, "2" should read -- 12 --

Column 23,
Line 42, "o&" should read -- of --

Column 24,
Line 52, "39" should read -- 38 --

Signed and Sealed this

Twenty-seventh Day of January, 2004

JON W. DUDAS
*Acting Director of the United States Patent and Trademark Office*